US011949959B2

(12) United States Patent
Morita et al.

(10) Patent No.: US 11,949,959 B2
(45) Date of Patent: Apr. 2, 2024

(54) CABLE, CONTROL INFORMATION TRANSMISSION METHOD FOR CABLE, CONNECTION APPARATUS, ELECTRONIC EQUIPMENT, AND OUTPUT DATA CONTROLLING METHOD FOR ELECTRONIC EQUIPMENT

(71) Applicant: SONY CORPORATION, Tokyo (JP)

(72) Inventors: Hiroshi Morita, Tokyo (JP); Kazuaki Toba, Tokyo (JP); Kazuo Yamamoto, Tokyo (JP); Masanari Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 912 days.

(21) Appl. No.: 16/975,468

(22) PCT Filed: Jan. 28, 2019

(86) PCT No.: PCT/JP2019/002821
§ 371 (c)(1),
(2) Date: Aug. 25, 2020

(87) PCT Pub. No.: WO2019/151198
PCT Pub. Date: Aug. 8, 2019

(65) Prior Publication Data
US 2021/0082601 A1     Mar. 18, 2021

(30) Foreign Application Priority Data

Feb. 1, 2018 (JP) .................................. 2018-016163

(51) Int. Cl.
*H01B 9/00* (2006.01)
*G06F 3/00* (2006.01)
(Continued)

(52) U.S. Cl.
CPC ............... *H04N 21/61* (2013.01); *G06F 3/00* (2013.01); *H01B 9/00* (2013.01); *H04N 21/436* (2013.01)

(58) Field of Classification Search
None
See application file for complete search history.

(56) References Cited

U.S. PATENT DOCUMENTS 4,878,245 A     10/1989  Bradley et al.
2007/0236605 A1  10/2007  Saito et al.
(Continued)

FOREIGN PATENT DOCUMENTS

CA     2256024 C    10/2003
CA     2540082 A1   12/2005
(Continued)

OTHER PUBLICATIONS

Song Gang, "Research on Real time Monitoring Technology of Leaky Cable Based on Signal Transmission in Daqin Line" China Academic Journal Electronic Publishing House, Jun. 2009, pp. 73-75.
(Continued)

*Primary Examiner* — Fahmida Rahman
(74) *Attorney, Agent, or Firm* — CHIP LAW GROUP

(57) ABSTRACT

It is made possible to perform data transmission through a cable satisfactorily. A cable is connected between first electronic equipment and second electronic equipment. The cable includes a current consumption unit that receives supply of current from the first electronic equipment through a power supply line, a current monitor unit that observes a current amount the first electronic equipment is capable of supplying to the power supply line, and an information transmission unit that transmits control information according to the observed current amount to the first electronic (Continued)

equipment. The first electronic equipment controls the state of data to be supplied to the cable, on the basis of the control information transmitted thereto from the cable.

8 Claims, 19 Drawing Sheets

(51) Int. Cl.
*H01B 11/22* (2006.01)
*H04N 21/436* (2011.01)
*H04N 21/61* (2011.01)

(56) References Cited

U.S. PATENT DOCUMENTS

| | | |
|---|---|---|
| 2012/0229706 A1 | 9/2012 | Kabuto |
| 2014/0009561 A1 | 1/2014 | Sutherland et al. |
| 2015/0113547 A1 | 4/2015 | Wolf et al. |
| 2017/0344508 A1 | 11/2017 | Setiawan et al. |
| 2018/0332371 A1* | 11/2018 | Suzuki ............... H04Q 11/0005 |

FOREIGN PATENT DOCUMENTS

| | | |
|---|---|---|
| CN | 1454800 A | 11/2003 |
| CN | 101004941 A | 7/2007 |
| CN | 101978569 A | 2/2011 |
| CN | 102740034 A | 10/2012 |
| CN | 101004941 B | 11/2012 |
| JP | 2003-348376 A | 12/2003 |
| JP | 2004-086359 A | 3/2004 |
| JP | 2004086359 A | 3/2004 |
| JP | 2004-232873 A | 8/2004 |
| JP | 2007194845 A | 8/2007 |
| JP | 2012191282 A | 10/2012 |
| JP | 2015053265 A | 3/2015 |

OTHER PUBLICATIONS

Office Action for CN Patent Application No. 201980021893.9, dated Apr. 28, 2022, 09 pages of English Translation and 08 pages of Office Action.

* cited by examiner

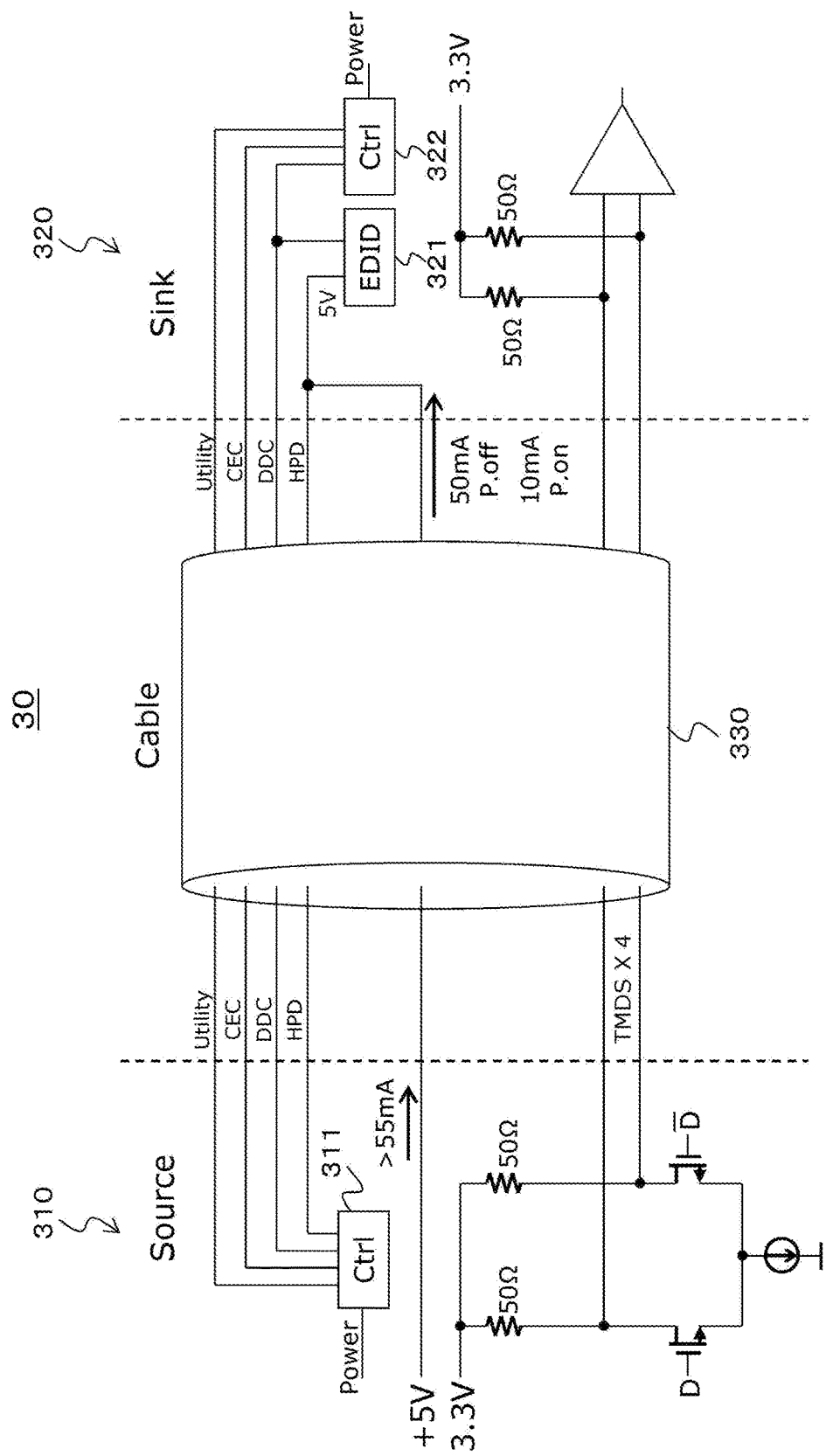
F I G. 1

FIG.6

| No. | USABLE CURRENT AMOUNT | INFORMATION | REMARKS |
|---|---|---|---|
| 1 | 55mA | 3.4Gbps | CABLE OPERATIVE SPEED |
| 2 | 100mA | 6Gbps | CABLE OPERATIVE SPEED |
| 3 | 150mA | 8Gbps | CABLE OPERATIVE SPEED |
| 4 | 200mA | 10Gbps | CABLE OPERATIVE SPEED |
| 5 | 250mA | 12Gbps | CABLE OPERATIVE SPEED |

FIG. 19A

| No. | USABLE CURRENT AMOUNT | INFORMATION | REMARKS |
|---|---|---|---|
| 1 | LESS THAN 150 mA | Emphasis 1 | Emphasis SETTING INFORMATION DEMANDED FOR Source OUTPUT WAVEFORM |
| 2 | 150 mA OR MORE | Emphasis 2 | Emphasis SETTING INFORMATION DEMANDED FOR Source OUTPUT WAVEFORM |

FIG. 19B

| No. | USABLE CURRENT AMOUNT | INFORMATION | REMARKS |
|---|---|---|---|
| 1 | LESS THAN 150 mA | CABLE CHARACTERISTIC 1 | CHARACTERISTIC QUALITY INFORMATION OF CABLE TO BE ANNOUNCED TO Source |
| 2 | 150 mA OR MORE | CABLE CHARACTERISTIC 2 | CHARACTERISTIC QUALITY INFORMATION OF CABLE TO BE ANNOUNCED TO Source |

CABLE, CONTROL INFORMATION TRANSMISSION METHOD FOR CABLE, CONNECTION APPARATUS, ELECTRONIC EQUIPMENT, AND OUTPUT DATA CONTROLLING METHOD FOR ELECTRONIC EQUIPMENT

CROSS REFERENCE TO RELATED APPLICATIONS

This application is a U.S. National Phase of International Patent Application No. PCT/JP2019/002821 filed on Jan. 28, 2019, which claims priority benefit of Japanese Patent Application No. JP 2018-016163 filed in the Japan Patent Office on Feb. 1, 2018. Each of the above-referenced applications is hereby incorporated herein by reference in its entirety.

TECHNICAL FIELD

The present technology relates to a cable, a control information transmission method for a cable, a connection apparatus, electronic equipment, and an output data controlling method for electronic equipment and particularly to a cable and so forth including a current consumption unit such as a circuit for adjusting signal quality.

BACKGROUND ART

In recent years, an HDMI (High Definition Multimedia Interface) or a like interface is used as a digital interface for connecting pieces of CE (Consumer Electronics) equipment to each other. For example, PTL 1 describes the HDMI standard. In the HDMI standard, transmission of digital signals for video, audio, control, and so forth is performed using TMDS (Transition Minimized Differential Signaling) channels. It is to be noted that "HDMI" is a registered trademark.

CITATION LIST

Patent Literature

[PTL 1]
Japanese Patent Laid-Open No. 2015-111418

SUMMARY

Technical Problems

For example, in the case where the HDMI is used as a digital interface, source (Source) equipment such as a BD (Blu-ray Disc) player and a sink (Sink) equipment such as a television receiver (TV Receiver) are connected to each other by an HDMI cable. In the HDMI cable, four high-speed signal lines including a clock line, a +5 V power supply (+5 V Power) line, a DDC (Display Data Channel) line, a CEC (Consumer Electronics Control) line, an HPD (Hot Plug Detect) line, a utility (Utility) line, and so forth are assigned. In the high-speed signal line, digital signals for video, audio, control, and so forth are transmitted by TMDS data. In this case, a current driving type by which "0" and "1" of data are transmitted by drawing (Drawing) of current from a terminating resistor of 50Ω connected to 3.3 V on the sink side by the source side is used. It is to be noted that "Blu-ray" is a registered trademark.

The HDMI standard prescribes a sequence when an HDMI cable is connected, and, if plugs at the opposite ends of the cable are individually connected to source equipment and sink equipment, then a 5 V voltage is transmitted from the source equipment to the sink equipment through the +5 V power supply line. Then, if 5 V is detected in the sink equipment, then 5 V is transmitted from the sink equipment to the source equipment through the HPD line to notify the source equipment that the cable is coupled correctly.

If 5 V of the HPD line is detected, then the source equipment determines that connection to the cable is established and tries to read an EDID (Extended Display Identification Data) of the sink equipment side by using the DDC line. Thereafter, exchange of signals such as an HDCP is started using the DDC line between the source equipment and the sink equipment to thereby start transmission of a high-speed data signal using the TMDS line.

At this time, if a cable for which a characteristic up to a specific data rate is guaranteed is used, then communication can be achieved without any problem. However, in the case of an AOC (Active Optical Cable) that uses light for communication in place of a copper wire, a circuit for converting electricity into light and another circuit for converting light into electricity exist in plugs at the opposite ends of the cable. Thus, power is required for driving the circuits, and, in the case where the source equipment cannot supply the power sufficiently, the communication quality degrades. There is a possibility that a similar problem may also occur with an ACC (Active Copper Cable) in which a circuit for driving a 50Ω wire for electricity is built in the inside of the cable.

It is to be noted that, as a current consumption unit to be built in a cable, not only the AOC and ACC described above but also some different elements are possible. In such case, when the source equipment cannot supply sufficient power for driving the circuit of the current consumption unit, transmission of data or information through the cable cannot be performed satisfactorily.

The object of the present technology resides in making it possible to achieve data transmission through a cable satisfactorily.

Solution to Problems

A concept of the present technology resides in
a cable for being connected between first electronic equipment and second electronic equipment, including:
a current consumption unit configured to receive supply of current from the first electronic equipment through a power supply line;
a current monitor unit configured to observe a current amount the first electronic equipment is capable of supplying to the power supply line; and
an information transmission unit configured to transmit control information according to the observed current amount to the first electronic equipment.

The cable according to the present technology is connected between the first electronic equipment and the second electronic equipment and includes the power supply line for supplying current from the first electronic equipment to the second electronic equipment and the current consumption unit that receives supply of current from the first electronic equipment through the power supply line.

The current monitor unit observes a current amount the first electronic equipment is capable of supplying to the power supply line. For example, the current monitor unit may be configured such that it observes a current amount flowing through the power supply line when the current consumption unit is placed in a current consumption state as the current amount the first electronic equipment is capable of supplying to the power supply line. In this case, only by placing the current consumption unit in a current consumption state, the current monitor unit can observe the current amount the first electronic equipment is capable of supplying to the power supply line and can achieve observation simply and readily.

Further, for example, the current monitor unit may be configured such that it includes a variable current consumption circuit that receives supply of current from the first electronic equipment through the power supply line and observes maximum current that flows through the power supply line when a current consumption amount in the variable current consumption circuit is sequentially changed from a small amount to a great amount, as the current amount the first electronic equipment is capable of supplying to the power supply line. In this case, high current is not drawn directly from the first electronic apparatus, and the load to the first electronic equipment side can be reduced.

The information transmission unit transmits control information according to the observed current amount to the first electronic apparatus. For example, the information transmission unit may transmit the control information by a pulse signal of a specific pattern. In this case, the first electronic equipment can receive the control information accurately.

Further, for example, the information transmission unit may be configured such that it generates the control information in accordance with a table or by calculation on the basis of the observed current amount. In this case, by generating control information in accordance with the table, the load can be reduced in comparison with that where the control information is generated by calculation. On the other hand, by generating control information by calculation, it is unnecessary to prepare the table in advance.

Further, for example, the cable may be configured such that the current consumption unit includes a circuit for adjusting signal quality interposed in a data line and that the control information is information for controlling a state of data to be supplied from the first electronic equipment to the data line so as to allow the circuit to operate sufficiently. Here, for example, the control information may be information for controlling a data rate or a waveform characteristic. In this case, the state of data to be supplied from the first electronic equipment to the data line can be made to allow the circuit for adjusting signal quality interposed in the data line to operate sufficiently to thereby allow assurance of the communication quality.

In such manner, in the present technology, the current amount the first electronic equipment is capable of supplying to the power supply line is observed, and control information according to the current amount is transmitted to the first electronic equipment. Therefore, the first electronic equipment can control the state of data to be supplied to the data line of the cable on the basis of the control information and can perform data transmission through the cable satisfactorily.

Meanwhile, another concept of the present technology resides in electronic equipment for being connected to external equipment through a cable, including:

an information reception unit configured to receive control information from the cable; and a control unit configured to control a state of data to be supplied to a data line of the cable on the basis of the control information.

In the present technology, the information reception unit receives control information from the cable. For example, the information reception unit may receive the control information by a pulse signal of a specific pattern. In this case, it is possible to receive the control information accurately.

The control unit controls the state of data to be supplied to the data line of the cable on the basis of the control information. For example, the electronic equipment may be configured such that the control information is information for controlling a data rate or a waveform characteristic and that the control unit controls a data rate or a waveform characteristic of data to be supplied to a data line of the cable. In this case, the state of data to be supplied to the data line of the cable can be made to allow the circuit for adjusting signal quality interposed in the data line to operate sufficiently to thereby allow assurance of the communication quality.

In such manner, in the present technology, control information is received from the cable, and the state of data to be supplied to the data line of the cable is controlled on the basis of the control information. Therefore, it becomes possible to perform data transmission through the cable satisfactorily.

Advantageous Effect of Invention

According to the present technology, data transmission through the cable can be performed satisfactorily. It is to be noted that the advantageous effect described in the present specification is exemplary to the last and is not restrictive and that other additional advantageous effects may be applicable.

BRIEF DESCRIPTION OF DRAWINGS

FIG. 1 is a view depicting an example of a configuration of a transmission system that uses an HDMI as a digital interface.

FIG. 6 is a view depicting an example of a table for generating data rate information as control information.

FIGS. 19A and 19B illustrate views depicting another example of a table for generating control information.

DESCRIPTION OF EMBODIMENTS

Figure 2:
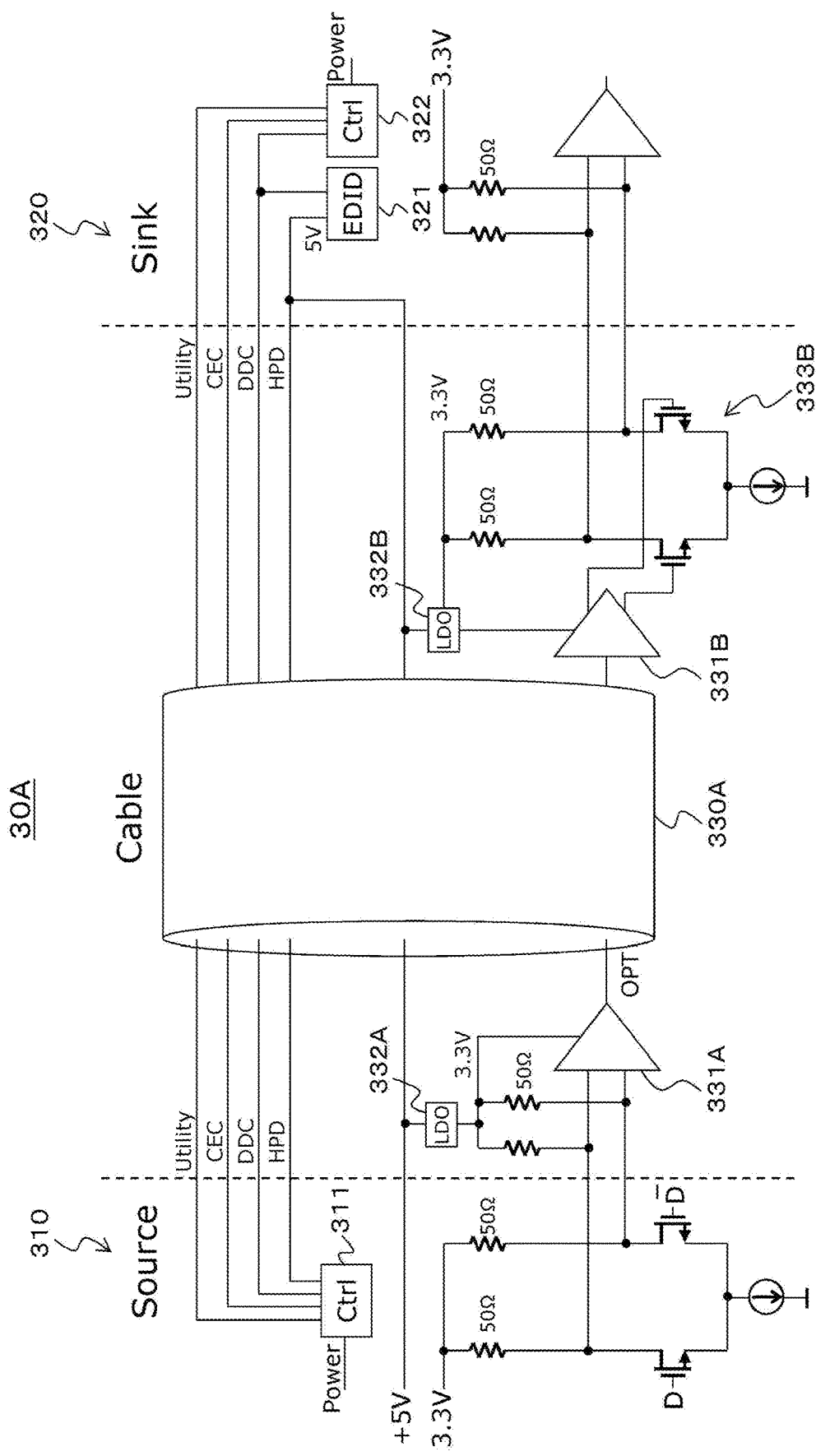
FIG. 2 is a view depicting an example of a configuration of a transmission system in the case where an HDMI cable that is an AOC is used.

In the following, a mode for carrying out the invention (hereinafter referred to as an "embodiment") is described. It is to be noted that the description is given in the following order.

1. Embodiments
2. Modification

1. Embodiments

[Configuration of Transmission System]

FIG. 1 depicts an example of a configuration of a transmission system 30. The transmission system 30 is an HDMI transmission system that uses the HDMI as a digital interface. The transmission system 30 includes source equipment 310 that is an HDMI transmitter, sink equipment 320 that is an HDMI receiver, and an HDMI cable 330 that connects them to each other.

As transmission channels of the transmission system 30, there are three TMDS channels that transmit video, audio, and control signals as digital signals by TMDS data and one TMDS clock channel that transmits a clock signal. The TMDS channels and the TMDS clock channel are each formed from two differential signal lines. In the example depicted, they are depicted for only one channel.

Further, as control signal lanes of the HDMI transmission system, a DDC line, a CEC line, an HPD line, a utility (Utility) line, and a +5 V power supply line are available. The DDC line includes two signal lines of an SDA line and an SCL line included in the HDMI cable 330. The DDC line is used, for example, by the source equipment 310 to read out an EDID from the sink equipment 320. The CEC line is used to perform bidirectional communication of data for control between the source equipment 310 and the sink equipment 320.

In the TMDS channel, a current driving type which transmits "0" and "1" of data by drawing (Draw) current from a 50Ω terminating resistor connected to the sink equipment 320 side to the source equipment 310 side is used. At this time, a signal is transmitted differentially on the basis of a differential signal of D and D (bar). It is to be noted that, while the example depicted indicates an example in which the 50Ω terminating resistor on the source equipment 310 side is used, only the 50Ω terminating resistor on the sink apparatus side can be used for driving, without using the first-mentioned 50Ω terminating resistor.

In the HDMI standard, a sequence when the HDMI cable 330 is connected is prescribed. If the opposite end plugs of the HDMI cable 330 are connected to the source equipment 310 and the sink equipment 320, then a 5 V voltage is transmitted from the source equipment 310 to the sink equipment 320 through the +5 V power supply line, and if the sink equipment 320 detects 5 V in the inside thereof, then 5 V is transmitted from the sink equipment 320 to the source equipment 310 through the HPD line to notify the source equipment 310 that the cable is connected correctly.

If a control unit 311 of the source equipment 310 detects 5 V of the HPD line, then it determines that the cable has been connected and tries to read the EDID using the DDC line from an EDID ROM 321 on the sink equipment 320 side. Thereafter, transfer of signals of the HDCP (High-bandwidth Digital Content Protection System) or the like is started between the source equipment 310 and the sink equipment 320 with use of the control line such as the DDC line, and transmission of TMDS data using the TMDS channels is started one-directionally from the source equipment 310 to the sink equipment 320. It is to be noted that the source equipment 310 and the sink equipment 320 can exchange information by using a register arranged in a control unit 322 of the sink equipment 320 side.

When the control unit 311 of the source equipment 310 tries to read the EDID from the EDID ROM 321 of the sink equipment 320 side by using the DDC line in such a manner as described above, there is a possibility that the ROM 321 consumes a maximum 50 mA, and the HDMI makes it possible to draw the 50 mA from the source equipment to the sink equipment through the cable. Meanwhile, the compensation value for current to be outputted from the +5 V power supply line in the source equipment 310 is 55 mA at minimum, and accordingly, the minimum value of current that can be used by the cable is 5 mA.

In such an ordinary HDMI cable 330 as depicted in FIG. 1, since power consumption in the cable is almost zero, 5 mA is sufficient. In contrast, in the case where an AOC (Active Optical Cable) is used as the HDMI cable, a circuit for conversion from electricity into light and a circuit for conversion from light into electricity are required in the opposite end plugs of the cable, and normally, it is difficult for the cable to operate with 5 mA. This similarly applies to a case in which an ACC (Active Copper Cable) is used as the HDMI cable.

FIG. 2 depicts an example of a configuration of a transmission system 30A in a case where an HDMI cable 330A that is an AOC is used. In FIG. 2, portions corresponding to those of FIG. 1 are denoted by identical reference signs, and detailed description of them is omitted.

In the case of the transmission system 30A, a conversion circuit 331A that converts electricity into light exists in the source side plug of the HDMI cable 330A while a conversion circuit 331B that converts light into electricity exists in the sink side plug of the HDMI cable 330A. To the conversion circuits 331A and 331B, a power supply of 3.3 V obtained by LDO (Low Drop Out) regulators 332A and 332B from +5 V of the +5 V power supply line is provided. It is to be noted that the conversion circuits 331A and 331B configure a circuit for adjusting signal quality interposed in the data line (TMDS line)

Further, in the source side plug of the HDMI cable 330A, 3.3 V obtained by the LDO regulator 332A is applied as a bias voltage to the data line (TMDS line) through a terminating resistor of 50Ω. Furthermore, in the sink side plug of the HDMI cable 330A, a current driving unit 333B for transmitting a signal differentially on the basis of differential signals obtained from the conversion circuit 331B is provided.

Figure 3:
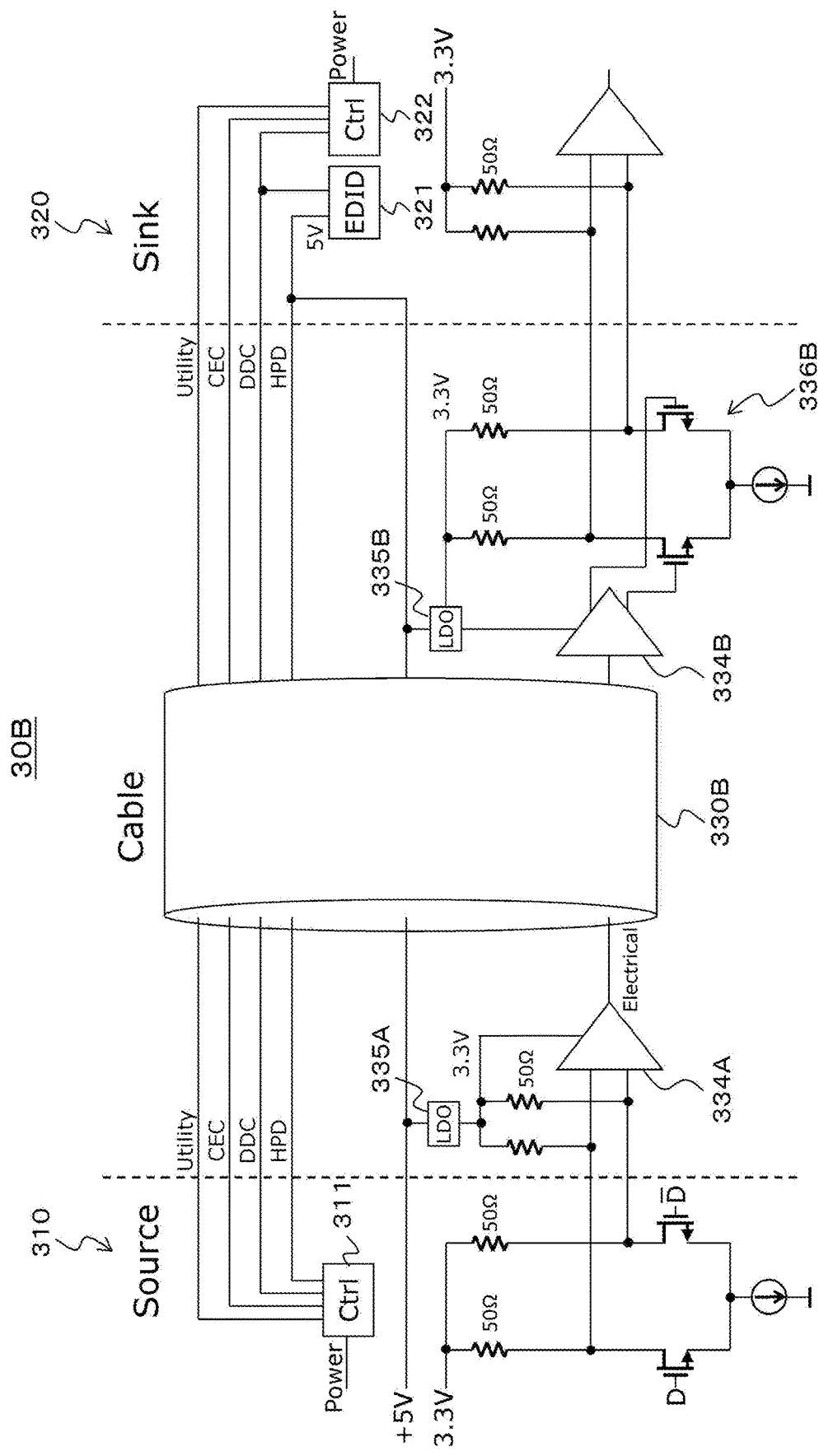
FIG. 3 is a view depicting an example of a configuration of a transmission system in the case where an HDMI cable that is an ACC is used.

FIG. 3 depicts an example of a configuration of a transmission system 30B in the case where an HDMI cable 330B that is an ACC is used. In this FIG. 3, portions corresponding to those of FIGS. 1 and 2 are denoted by identical reference signs, and detailed description of them is omitted.

In the case of the transmission system 30B, circuits 334A and 334B for driving an electric wire of 50Ω exist in the opposite side plugs of the HDMI cable 330B. To the circuits 334A and 334B, a power supply of 3.3 V obtained by the LDO regulators 335A and 335B from +5 V of the +5 V power supply line is provided. It is to be noted that the circuits 334A and 334B configure a circuit for adjusting the signal quality interposed in the data line (TMDS line).

Further, in the source side plug of the HDMI cable 330B, 3.3 V obtained by the LDO regulator 335A is applied as a bias voltage to the data line (TMDS line) through a terminating resister of 50Ω. Furthermore, in the sink side plug of the HDMI cable 330B, a current driving unit 336B for transmitting a signal differentially on the basis of a differential signal obtained from the conversion circuit 334B is provided.

Embodiment 1

Figure 4:
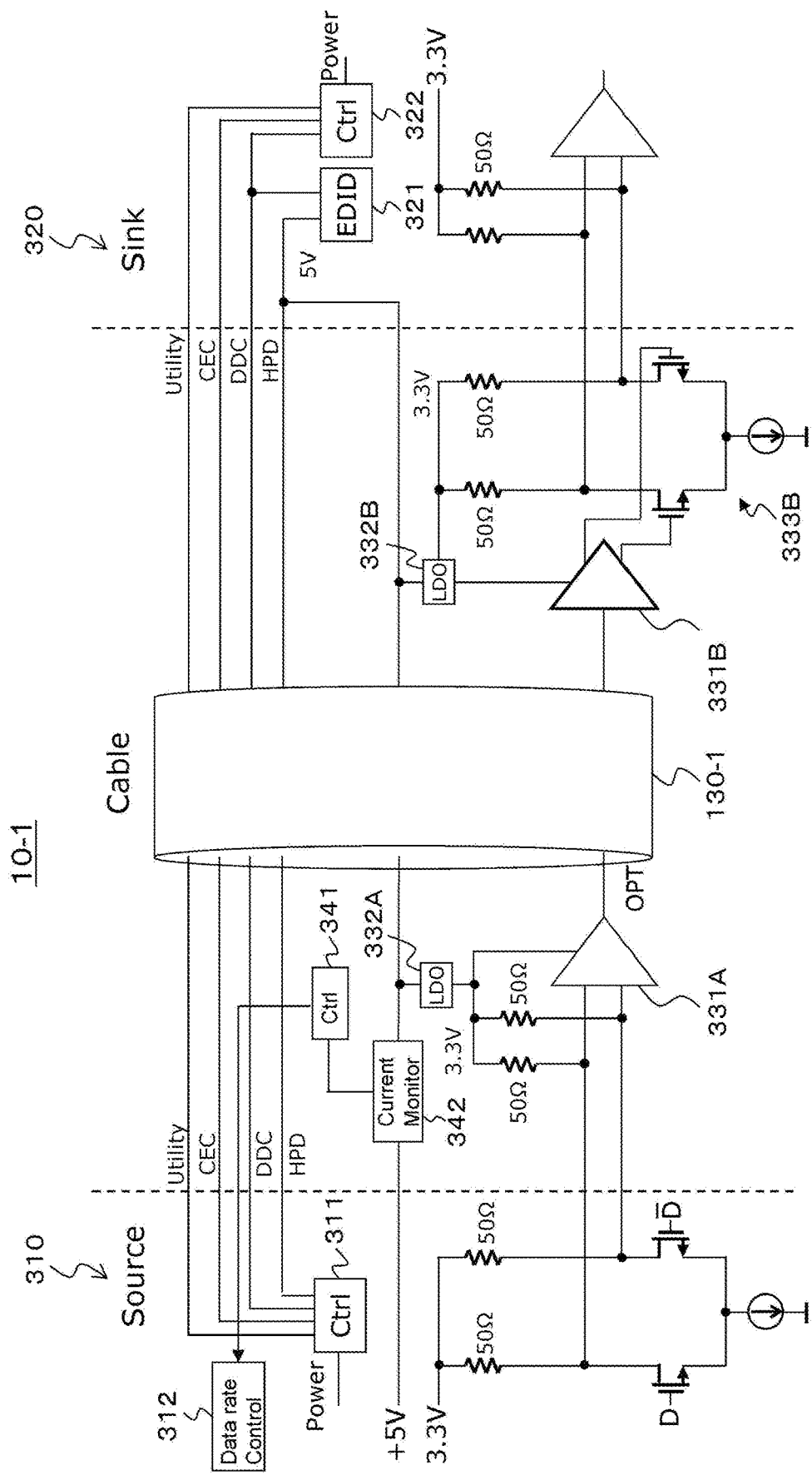
FIG. 4 is a view depicting an example of a configuration of a transmission system as an embodiment 1.

FIG. 4 depicts an example of a configuration of a transmission system 10-1 as an embodiment 1. The embodiment 1 is an HDMI transmission system in which the HDMI is used as a digital interface. The transmission system 10-1 includes source equipment 310 as a transmission apparatus, sink equipment 320 as a reception apparatus, and an HDMI cable 130-1 (hereinafter simply referred to as a "cable 130-1") that is an AOC connecting the source equipment 310 and the sink equipment 320 to each other. In this FIG. 4, portions corresponding to those of FIG. 2 are denoted by identical reference signs, and detailed description of them is suitably omitted.

In the case of the transmission system 10-1, a conversion circuit 331A that converts electricity into light exists in the source side plug of the cable 130-1 while a conversion circuit 331B for converting light into electricity exists in the sink side plug of the cable 130-1. A power supply of 3.3 V obtained by the LDO regulators 332A and 332B from +5 V of the +5 V power supply line is provided to the conversion circuits 331A and 331B. It is to be noted that the conversion circuits 331A and 331B configure a circuit for adjusting signal quality interposed in a data line (TMDS line).

Further, in the source side plug of the cable 130-1, 3.3 V obtained by the LDO regulator 332A is applied as a bias voltage to the data line (TMDS line) through a terminating resistor of 50Ω. Furthermore, in the sink side plug of the cable 130-1, a current driving unit 333B for transmitting a signal differentially on the basis of differential signals obtained from the conversion circuit 331B is provided.

Further, in the source side plug of the cable 130-1, a control unit 341 for controlling the components of the cable 130-1 and a current monitor unit 342 are provided. The current monitor unit 342 observes a current amount the source equipment 310 can supply to the +5 V power supply line and transmits the observed current amount to the control unit 341. For example, when the conversion circuits 331A and 331B are placed in an operative state, i.e., a current consumption state, the current monitor unit 342 observes current flowing through the +5 V power supply line as a current amount the source equipment 310 can supply to the +5 V power supply line.

Further, for example, the current monitor unit 342 includes a variable current consumption circuit that receives supply of current from the source equipment 310 through the +5 V power supply line. The current monitor unit 342 observes maximum current that flows through the +5 V power supply line when the current consumption amount in the variable current consumption circuit is successively changed from a small amount to a great amount, as a current amount the source equipment 310 can supply to the +5 V power supply line. In this case, the conversion circuits 331A and 331B are placed in an inoperative state, i.e., a current non-consumption state. In this case, although it is necessary to include a variable current consumption circuit, great current is not drawn directly from the source equipment 310, and the load on the source equipment 310 side can be reduced.

Figures 5A, 5B:
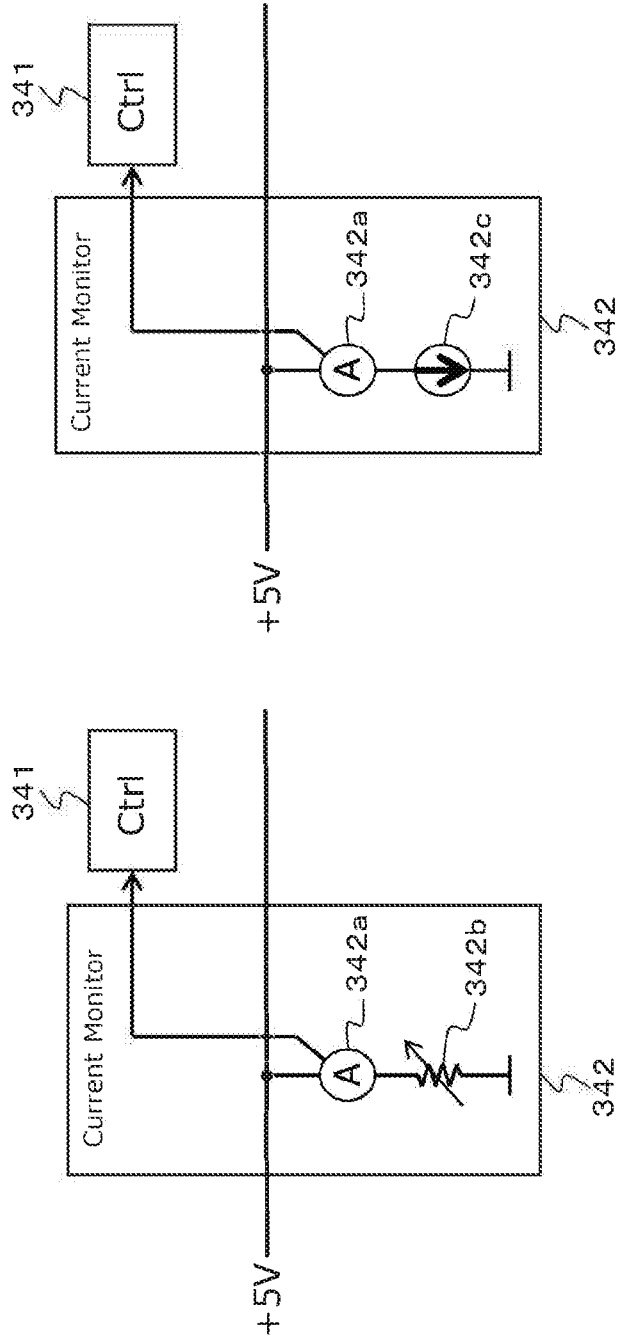
FIGS. 5A and 5B illustrate views depicting examples of a configuration of a current monitor unit.

FIGS. 5A and 5B depict examples of a configuration of the current monitor unit 342. In FIG. 5A, the current monitor unit 342 is configured such that a series circuit of an ammeter 342a and a variable resistor 342b is connected between the +5 V power supply line and the ground (ground). In this case, by successively changing the resistance value of the variable resistor 342b to 100 0, 50 0, and 25 0, current can be drawn stepwise as 50 mA, 100 mA, and 200 mA, and the supply current when it hits the ceiling is a current amount the source equipment 310 can supply to the +5 V power supply line. It is to be noted that the control of the resistance value of the variable resistor 342b is performed by the control unit 341.

Meanwhile, in FIG. 5B, the current monitor unit 342 is configured such that a series circuit of the ammeter 342a and a current source 342c is connected between the +5 V power supply line and the ground (ground). In this case, current is directly drawn by the current source 342c, and while the current is successively changed from a small amount to a great amount, the supply current when it hits the ceiling is a current amount the source equipment 310 can supply to the +5 V power supply line. It is to be noted that the control of the current value of the current source 342c is performed by the control unit 341.

The control unit 341 generates control information according to a current amount observed by the current monitor unit 342, i.e., a current amount the source equipment 310 can supply to the +5 V power supply line, and transmits the control information to the source equipment 310. In this embodiment, the control information is information for controlling the data rate of data to be supplied from the source equipment 310 to the data line (TMDS line).

The control unit 341 generates control information by a method determined in advance, i.e., a table or calculation, according to the current amount observed by the current monitor unit 342, i.e., the current amount the source equipment 310 can supply to the +5 V power supply line (hereinafter suitably referred to as an "available current amount"), and the current amount consumed in the cable 130-1. Generating control information by using a table makes it possible to reduce the load in comparison with that in the case where control information is generated by calculation. On the other hand, by generating control information by calculation, it becomes unnecessary to prepare a table in advance.

In the case where control information is generated using a table, the control unit 341 has, in the cable 130-1, a table indicative of a correspondence relation between operable data rates and current amounts to be consumed in the cable 130-1 (hereinafter suitably referred to as a "usable current amount"). Thus, the control unit 341 compares the available current amount with the usable current amounts in the table to determine an operable data rate and generates the data rate information as control information.

FIG. 6 depicts an example of the table. For example, when the available current amount is 250 mA or more, it is determined that the operable data rate is 12 Gbps. On the other hand, for example, when the available current amount is equal to or greater than 100 mA but smaller than 150 mA, it is determined that the operable data rate is 6 Gbps. It is to be noted that, in the case the operable data rate is determined to be 12 Gbps, when the default value of the data rate in the source equipment 310 is 12 Gbps, the control unit 341 can omit generation of control information and transmission of such control information to the cable 130-1.

For example, information directly indicating a data rate may be used as the data rate information. Further, for example, information indicating coefficients of an expression used for calculating the data rate may be used as the data rate information. Meanwhile, for example, in the case where the source equipment 310 has a table which is the same as the table (FIG. 6) the cable 130-1 has therein, information indicative of a number "No." corresponding to the data rate may be used as the data rate information.

The control unit 341 transmits control information to the source equipment 310 by using various signal lines prescribed by the HDMI, for example, such control signal line as the DDC. In this case, the control unit 341 transmits the control information, for example, by a pulse signal of a specific pattern. This makes it possible for the source equipment 310 to accurately receive the control information.

Figure 7:
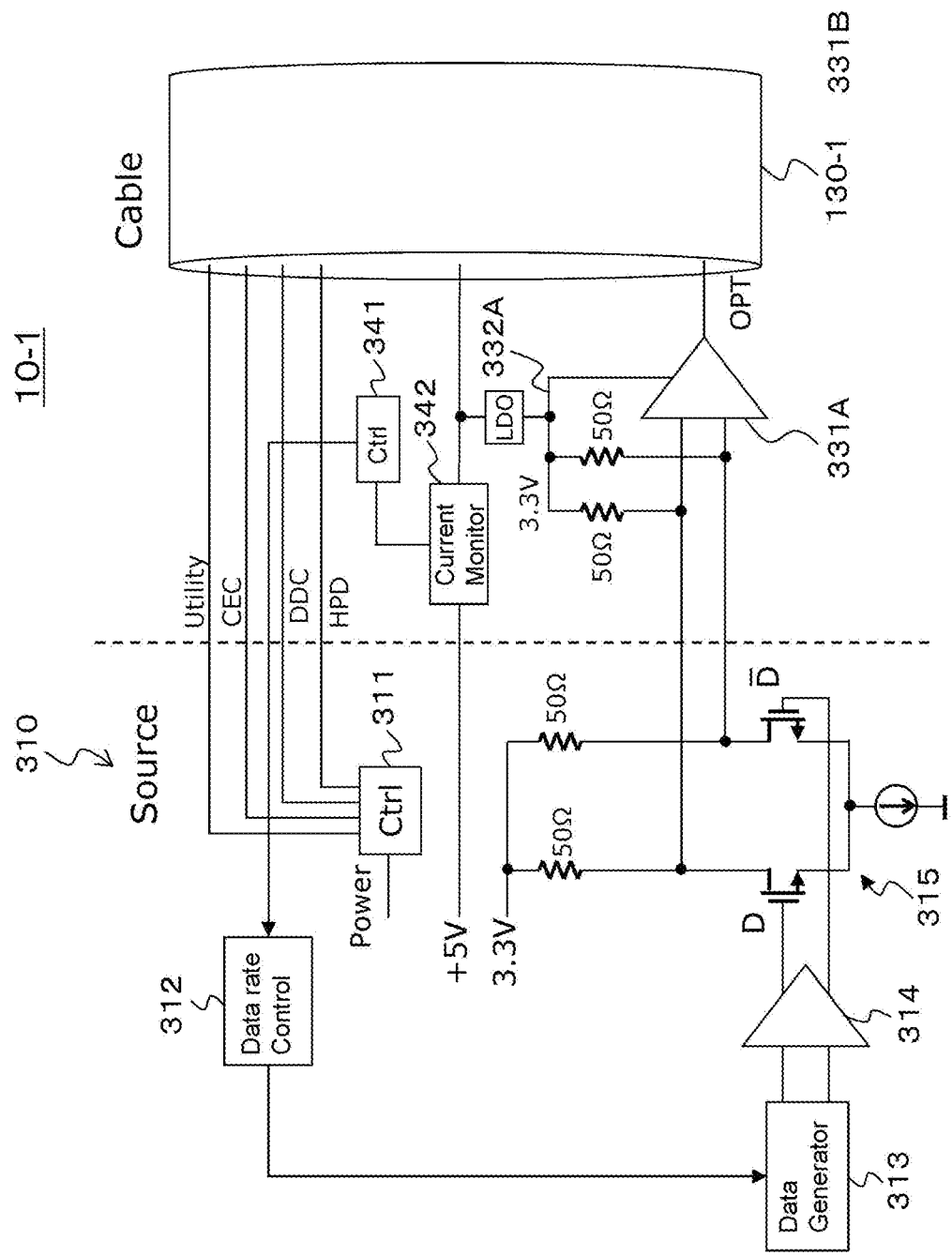
FIG. 7 is a view illustrating data rate control in source equipment.

When the source equipment 310 is to change the data rate, it is necessary to determine a data rate taking, for example, the EDID information of the sink equipment 320 into consideration. The source equipment 310 receives, at a data rate control unit 312 thereof, the control information (information for controlling the data rate). The data rate control unit 312 transmits the control information to a data generation unit 313 as depicted in FIG. 7. The data generation unit 313 generates data whose data rate is changed according to the control information and transmits the data to a driver (current driving unit) 315 through a buffer 314 so that the data is outputted to the data line (TMDS line).

Figure 8:
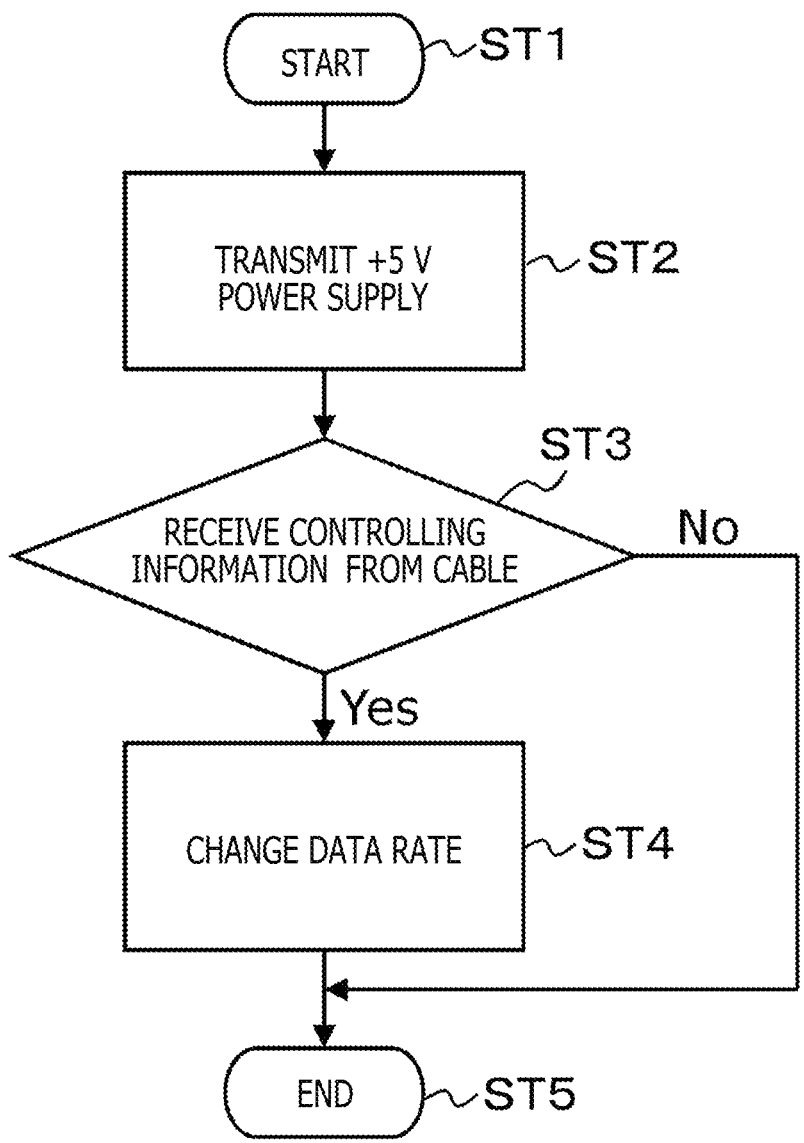
FIG. 8 is a flow chart depicting an example of a sequence of the source equipment.

FIG. 8 depicts an example of a sequence of the source equipment 310. In step ST1, for example, if a power supply switch is turned on and +5 V rises, then the sequence is started, and the sequence advances to step ST2. In this step ST2, +5 V is transmitted to the cable 130-1. In short, a +5 V power supply is supplied to the power supply line of the cable 130-1.

Then, in step ST3, it is determined whether or not control information (information for controlling the data rate) is received from the cable 130-1. When the control information is received, the data rate is changed on the basis of the control information in step ST4, and thereafter, the sequence is ended in step ST5. On the other hand, in the case where no control information is received in step ST3, the sequence directly advances to step ST5, in which the sequence is ended.

Figure 9:
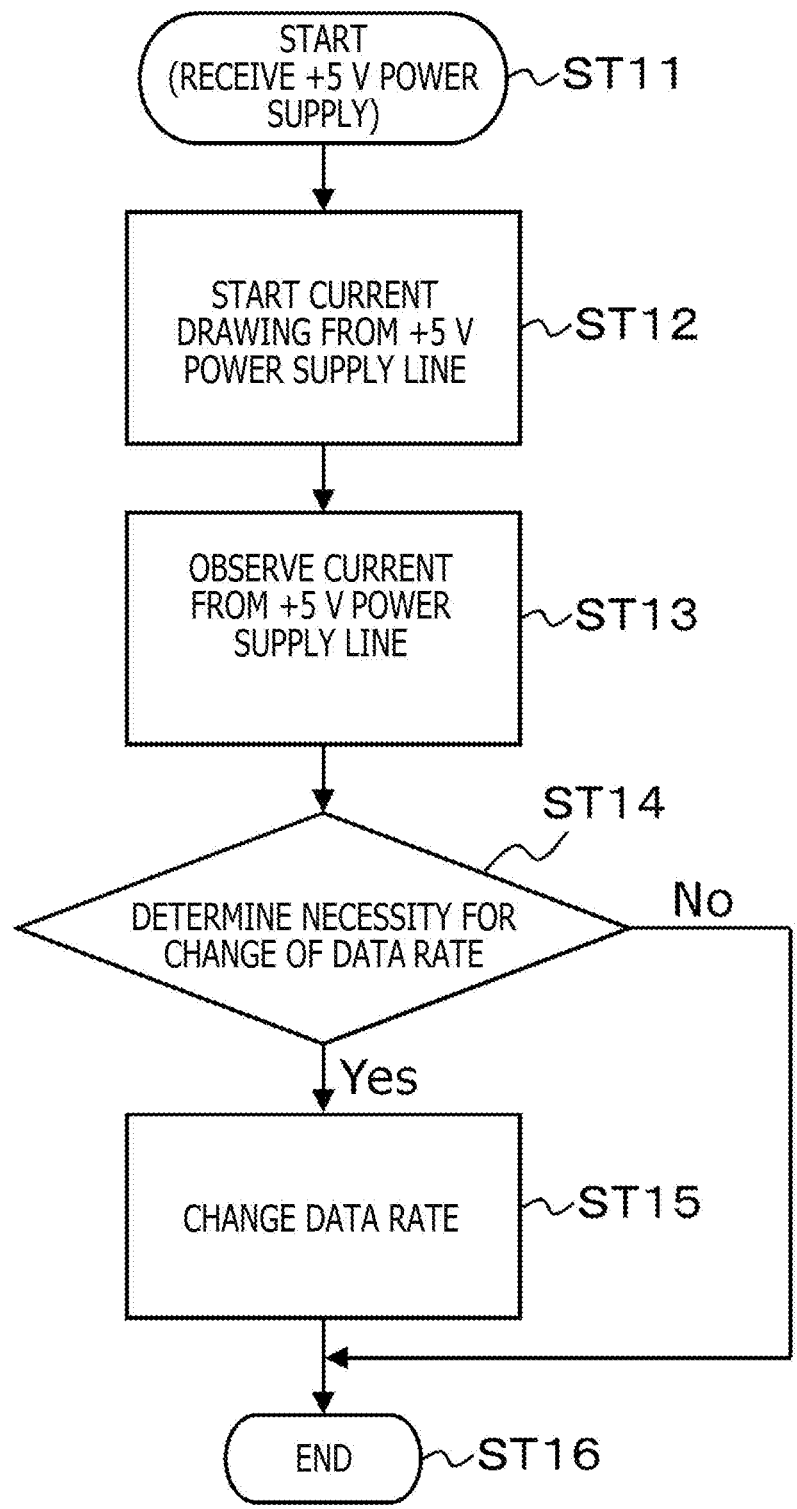
FIG. 9 is a flow chart depicting an example of a sequence of a cable.

FIG. 9 depicts an example of a sequence of the cable 130-1. This example is an example in which the current monitor unit 342 places the conversion circuits 331A and 331B in an operative state, i.e., a current consumption state, and current flowing through the +5 V power supply line is observed as a current amount the source equipment 310 can supply to the +5 V power supply line (available current amount).

If, in step ST11, a +5 V power supply is received, i.e., a +5 V power supply is supplied to the +5 V power supply line, then the sequence is started, and the sequence advances to step ST12. In this step ST12, the conversion circuits 331A and 331B are placed in an operative state, i.e., a current consumption state, to start drawing of current from the +5 V power supply line.

Then, in step ST13, the current monitor unit 342 observes current flowing through the +5 V power supply line, as a current amount the source equipment 310 can supply to the +5 V power supply line (available current amount).

Then in step ST14, the control unit 341 calculates an operable data rate on the basis of the observed available current amount and determines whether or not change of the data rate in the source equipment 310 is necessary. When change of the data rate is necessary, control information is generated by the control unit 341 and transmitted to the source equipment 310 in step ST15. Thereafter, the sequence is ended in step ST16. On the other hand, when change of the data rate is not necessary in step ST14, the sequence directly advances to step ST16, in which the sequence is ended.

Figure 10:
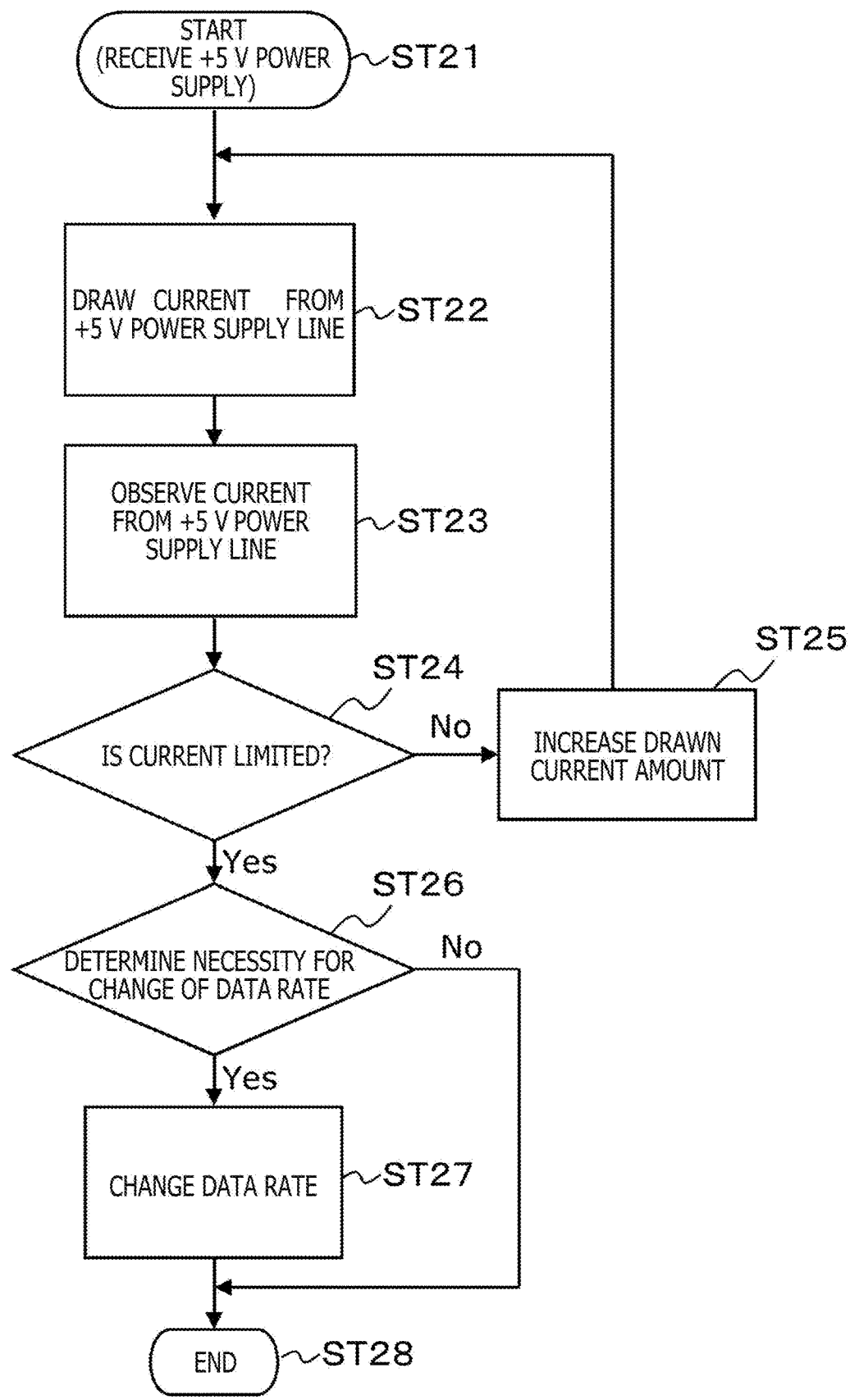
FIG. 10 is a flow chart depicting another example of a sequence of a cable.

FIG. 10 depicts another example of a sequence of the cable 130-1. This example is an example in which the maximum current flowing through the +5 V power supply line when the current consumption amount in a variable current consumption circuit that receives supply of current from the source equipment 310 through the +5 V power supply line is successively changed from a small amount to a great amount is observed as a current amount the source equipment 310 can supply to the +5 V power supply line (available current amount).

If, in step ST21, a +5 V power supply is received, i.e., a +5 V power supply is supplied to the +5 V power supply line, then a sequence is started and advances to step ST22. In this step ST22, drawing of current from the +5 V power supply line is performed by the variable current consumption circuit, and in step ST23, current flowing through the +5 V power supply line is observed by the current monitor unit 342.

Then, in step ST24, it is determined whether or not the current amount observed by the current monitor unit 342 has hit the ceiling, i.e., whether or not there is a current limit. In this case, even if the drawn current amount in the variable current consumption circuit is increased, if the current amount observed by the current monitor unit 342 does not increase from a supposed current amount, then it can be determined that the current amount has hit the ceiling.

When it is determined that the current amount has not hit the ceiling, the drawn current amount in the variable current consumption circuit is increased in step ST25, and then the sequence returns to step ST22. On the other hand, when it is determined that the current amount has hit the ceiling, the current amount which has hit the ceiling (maximum current amount) is observed as a current amount the source equipment 310 can supply to the +5 V power supply line (available current amount). Then, the sequence advances to step ST26.

In step ST26, the control unit 341 calculates an operable data rate on the basis of the observed available current amount and determines whether or not change of the data rate in the source equipment 310 is necessary. When change of the data rate is necessary, control information is generated and transmitted to the source equipment 310 by the control unit 341 in step ST27, and then, in step ST28, the sequence is ended. On the other hand, when change of the data rate is not necessary in step ST26, the sequence directly advances to step ST28, in which the sequence is ended.

In the transmission system 10-1 depicted in FIG. 4, the cable 130-1 observes a current amount the source equipment 310 can supply to the power supply line (available current amount) and calculates an operable data rate with this current amount to generate and transmit control information (information for controlling the data rate) to the source equipment 310. Then, the source equipment 310 controls the data rate on the basis of the control information transmitted thereto from the cable 130-1. Therefore, even in the case where the current amount the source equipment 310 can supply to the +5 V power supply line (available current amount) is suppressed, data transmission from the source equipment 310 to the sink equipment 320 can be performed, and video outputting and so forth are made possible by the sink equipment 320.

It is to be noted that, in the case where the sink equipment side includes a mechanism for monitoring the signal quality, communication quality may be secured even in the case where the current amount the source equipment can supply to the power supply line is suppressed, if the data rate is decreased until signal quality is recovered by negotiation between the source equipment and the sink equipment. However, since a mechanism for determining the communication quality on the sink equipment side generally adopts a method for measuring the bit error rate (BER: Bit Error Rate), the circuit scale and the power consumption of the sink equipment increase significantly.

In the transmission system 10-1 described above, it is possible to control the data rate to secure communication quality without increasing the circuit scale and the power consumption of the sink equipment significantly and without taking such a step that the data rate is decreased until the signal quality is recovered by negotiation between the source equipment and the sink equipment.

Embodiment 2

Figure 11:
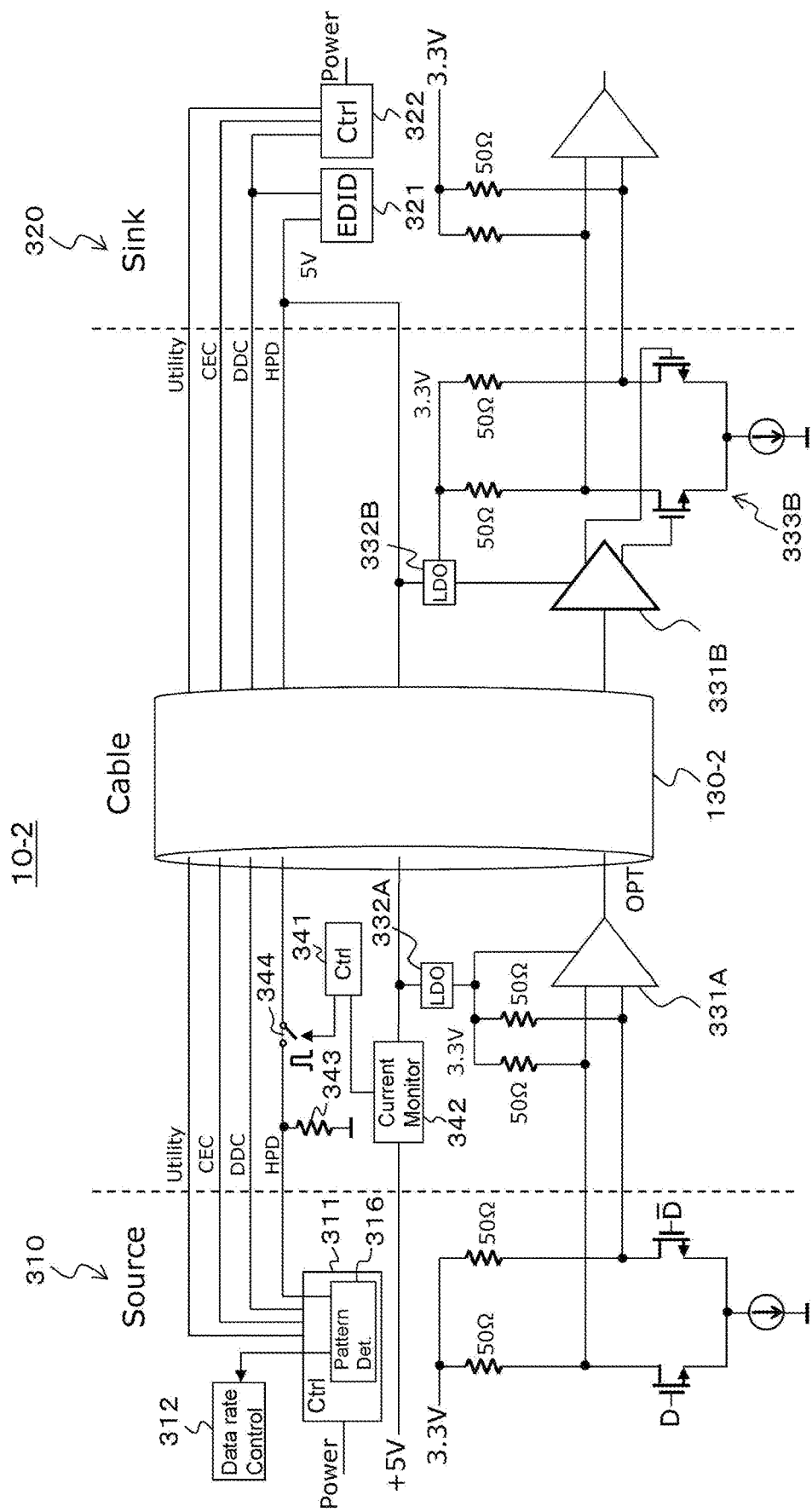
FIG. 11 is a view depicting an example of a configuration of a transmission system as an embodiment 2.

FIG. 11 depicts an example of a configuration of a transmission system 10-2 as an embodiment 2. The transmission system 10-2 is an HDMI transmission system in which the HDMI is used as a digital interface. The transmission system 10-2 includes source equipment 310 as a transmission apparatus, sink equipment 320 as a reception apparatus, and an HDMI cable 130-2 (hereinafter simply referred to as a "cable 130-2") that is an AOC connecting the source equipment 310 and the sink equipment 320 to each other. In this FIG. 11, portions corresponding to those in FIG. 4 are denoted by identical reference signs, and detailed description of them is suitably omitted.

In the transmission system 10-2 depicted in FIG. 11, control information generated by the control unit 341 of the cable 130-2 is transmitted by a pulse signal of a specific pattern to the source equipment 310 through an HPD line.

In this case, in the source side plug, a pull-down resistor 343 is connected to the HPD line, and a switch 344 is provided on the sink equipment 320 side with respect to the insertion position of the pull-down resistor 343. The switch 344 is driven to open or close by the control unit 341 and generates a pulse signal of a specific pattern including control information (information for controlling the data rate). In this case, the pulse signal of the specific pattern may be generated not only once but a plural number of times in order to assure stable reception by the reception side.

Further, the source equipment 310 includes a pattern detection unit 316. The pattern detection unit 316 extracts control information from the pulse signal transmitted thereto by the HPD line and transmits the control information to the data rate control unit 312. The source equipment 310 controls the data rate on the basis of the control information.

Figure 12:
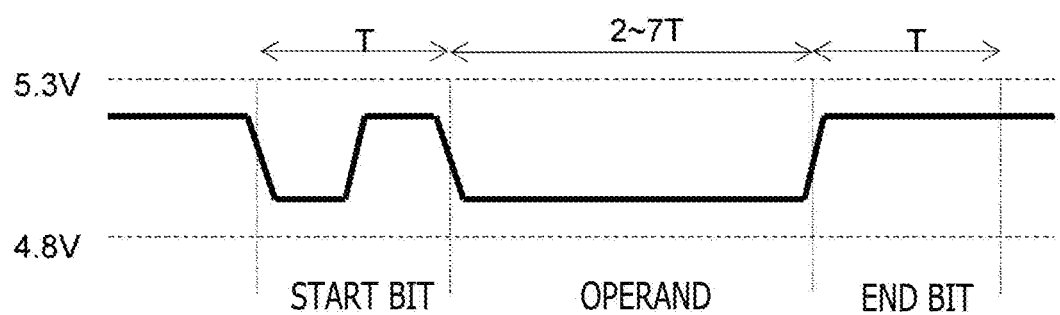
FIG. 12 is a view depicting an example of a form of a pulse signal.

FIG. 12 depicts an example of a form of the pulse signal. As depicted in FIG. 12, the pulse signal is a signal train including, for example, a start bit, an operand, and an end bit. The pattern detection unit 316 of the source equipment 310 recognizes a communication timing from the start bit, receives the operand, and recognizes an end of the operand from the end bit. In this embodiment, the control information is included in the operand.

It is to be noted that the switch 344 of the cable 130-2 is placed in a closed state after the pulse signal is transmitted. Accordingly, normal operation becomes possible. The other parts of the transmission system 10-2 depicted in FIG. 11 are configured similarly and operate similarly to those of the transmission system 10-1 described hereinabove with reference to FIG. 4. Also in the transmission system 10-2 depicted in FIG. 11, advantageous effects similar to those obtained by the transmission system 10-1 described hereinabove with reference to FIG. 4 can be achieved.

Embodiment 3

Figure 13:
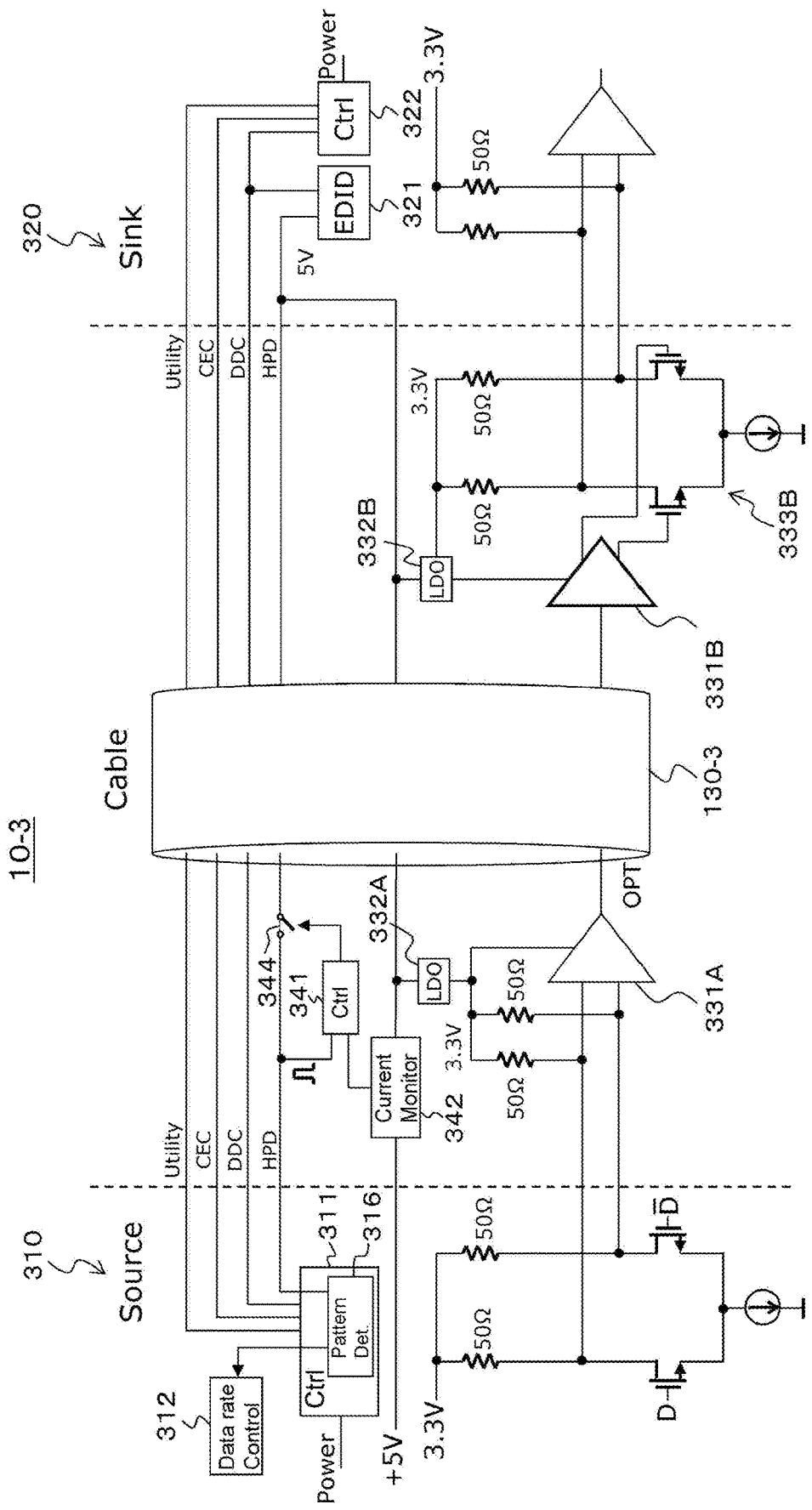
FIG. 13 is a view depicting an example of a configuration of a transmission system as an embodiment 3.

FIG. 13 depicts an example of a configuration of a transmission system 10-3 as an embodiment 3. The transmission system 10-3 is an HDMI transmission system in which the HDMI is used as a digital interface. The transmission system 10-3 includes source equipment 310 as a transmission apparatus, sink equipment 320 as a reception apparatus, and an HDMI cable 130-3 (hereinafter simply referred to as a "cable 130-3") that is an AOC connecting the source equipment 310 and the sink equipment 320 to each other. In this FIG. 13, portions corresponding to those of FIG. 11 are denoted by identical reference signs, and detailed description of them is suitably omitted.

Also in the transmission system 10-3 depicted in FIG. 13, control information generated by the control unit 341 of the cable 130-3 is transmitted by a pulse signal of a specific pattern to the source equipment 310 through an HPD line. In a state in which the switch 344 is open, the control unit 341 directly supplies a pulse signal of a specific pattern including control information to a portion on the source equipment 310 side from the switch 344 of the HPD line. This pulse signal is transmitted to the source equipment 310 through the HPD line. It is to be noted that, after the pulse signal is transmitted, the switch 344 is placed in a closed state. Consequently, normal operation becomes possible.

The other parts of the transmission system 10-3 depicted in FIG. 13 are configured similarly and operate similarly to those of the transmission system 10-2 described hereinabove with reference to FIG. 11. Also in the transmission system 10-3 depicted in FIG. 13, advantageous effects similar to those obtained by the transmission system 10-2 described hereinabove with reference to FIG. 11 can be achieved. Further, in the transmission system 10-3, in the state in which the switch 344 is open, a pulse signal is supplied directly to the source equipment 310 side through the switch 344 of the HPD line, and generation of return noise to the sink equipment 320 at the time of transmission of a pulse signal can be avoided.

Embodiment 4

Figure 14:
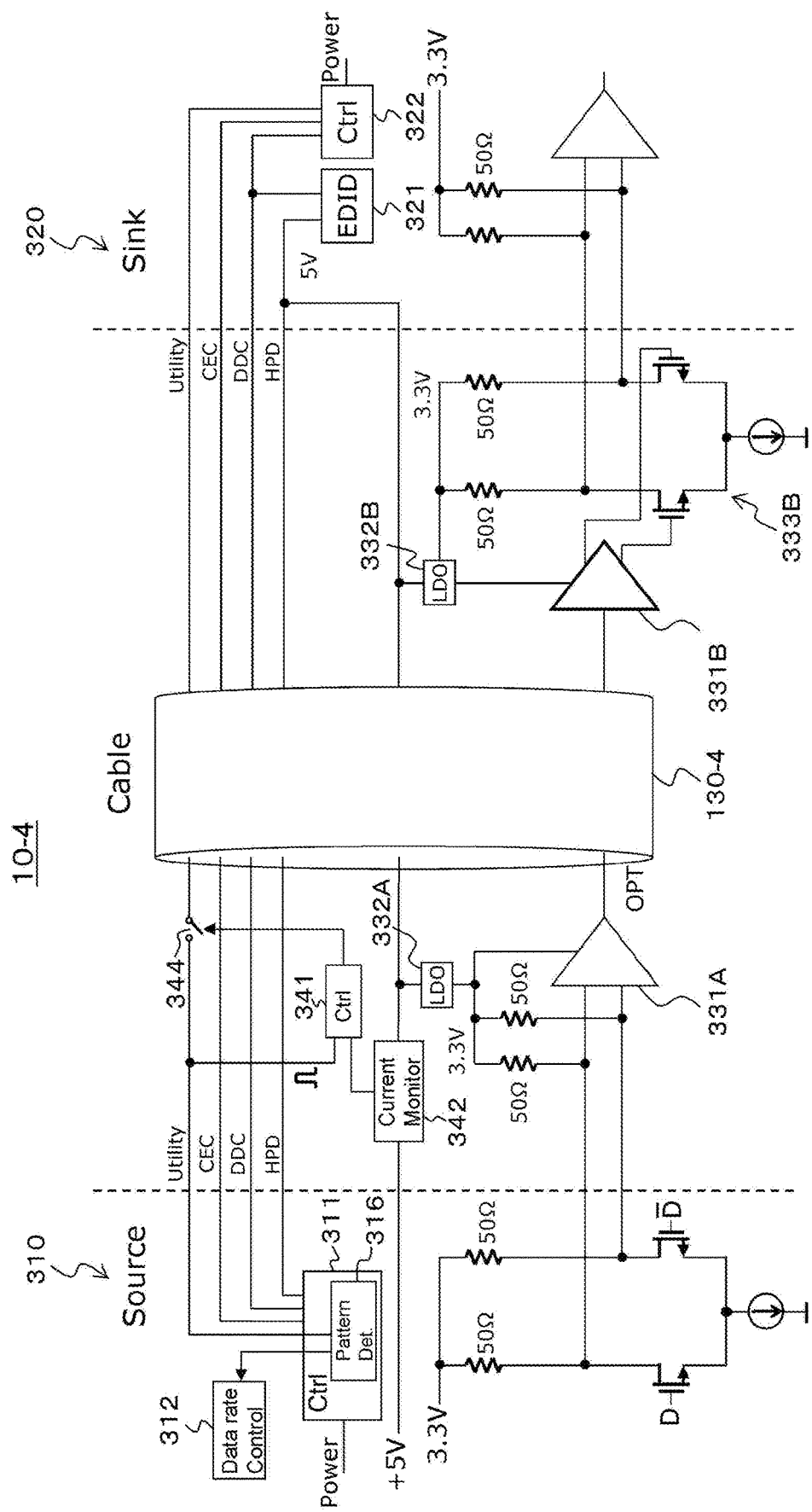
FIG. 14 is a view depicting an example of a configuration of a transmission system as an embodiment 4.

FIG. 14 depicts an example of a configuration of a transmission system 10-4 as an embodiment 4. The transmission system 10-4 is an HDMI transmission system in which the HDMI is used as a digital interface. The transmission system 10-4 includes source equipment 310 as a transmission apparatus, sink equipment 320 as a reception apparatus, and an HDMI cable 130-4 (hereinafter simply referred to as a "cable 130-4") that is an AOC connecting the source equipment 310 and the sink equipment 320 to each other. In this FIG. 14, portions corresponding to those of FIG. 13 are denoted by identical reference signs, and detailed description of them is suitably omitted.

In the transmission system 10-4 depicted in FIG. 14, control information generated by the control unit 341 of the cable 130-4 is transmitted by a pulse signal of a specific pattern to the source equipment 310 through a utility (Utility) line. In this case, a switch 344 is provided on the utility line in the source side plug.

In a state in which the switch 344 is open, the control unit 341 directly supplies a pulse signal of a specific pattern including control information, from the switch 344 of the utility line to a portion on the source equipment 310 side. This pulse signal is transmitted to the source equipment 310 through the utility line. It is to be noted that the switch 344 is placed into a closed state after the pulse signal is transmitted. Consequently, normal operation becomes possible.

Further, the pattern detection unit 316 of the source equipment 310 extracts control information from the pulse signal transmitted thereto by the utility line and transmits the control information to the data rate control unit 312. The source equipment 310 controls the data rate on the basis of the control information.

The other parts of the transmission system 10-4 depicted in FIG. 14 are configured similarly and operate similarly to those of the transmission system 10-3 described hereinabove with reference to FIG. 13. Also in the transmission system 10-4 depicted in FIG. 14, advantageous effects similar to those obtained by the transmission system 10-3 described hereinabove with reference to FIG. 13 can be achieved. It is to be noted that, in the transmission system 10-4 depicted in FIG. 14, although the switch 344 is provided such that a pulse signal to be placed on the utility line does not have any influence on the sink equipment 320 side, in the case where the influence on the sink equipment 320 can be ignored, the switch 344 is unnecessary.

Embodiment 5

Figure 15:
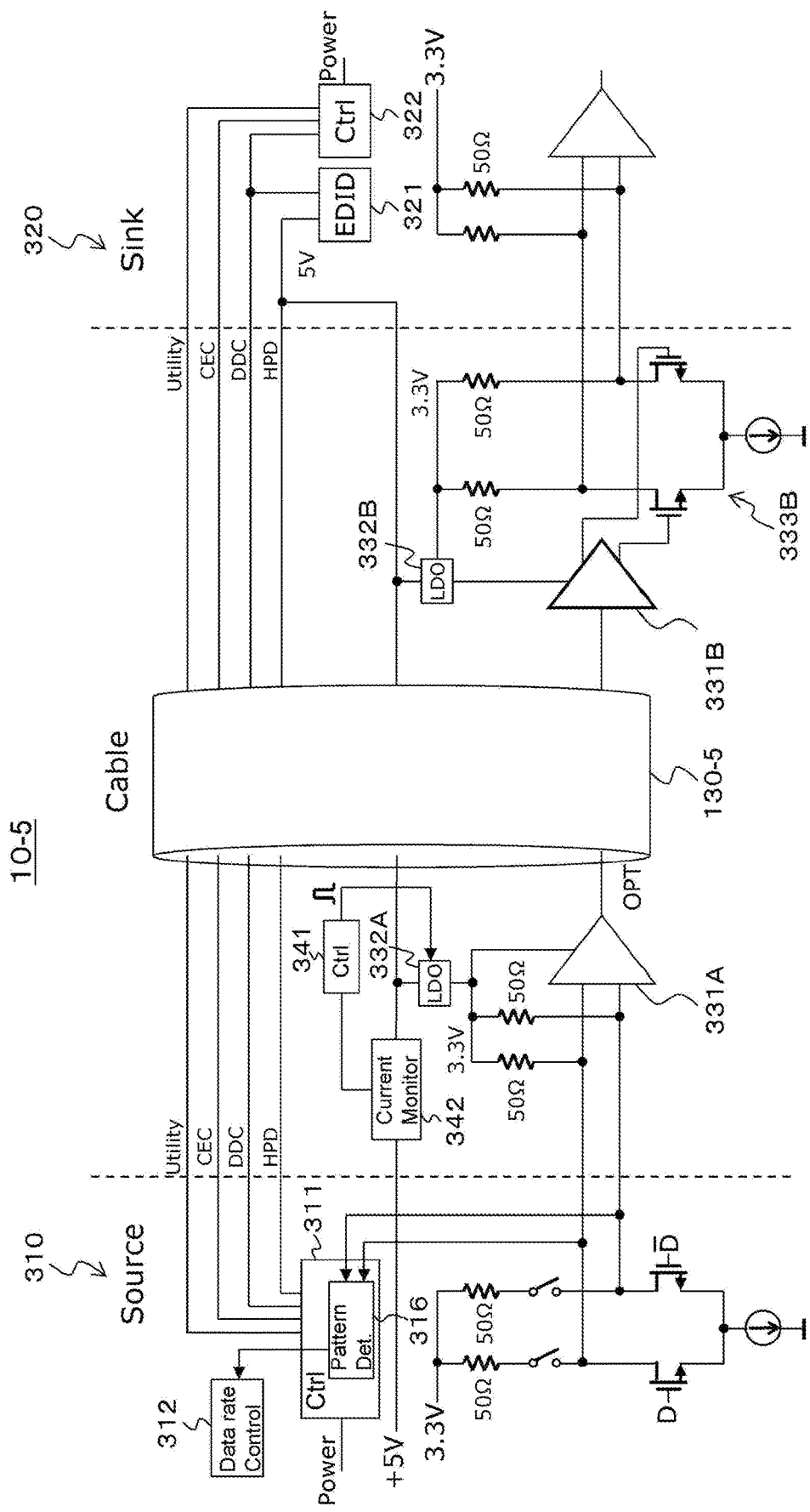
FIG. 15 is a view depicting an example of a configuration of a transmission system as an embodiment 5.

FIG. 15 depicts an example of a configuration of a transmission system 10-5 as an embodiment 5. The transmission system 10-5 is an HDMI transmission system in which the HDMI is used as a digital interface. The transmission system 10-5 includes source equipment 310 as a transmission apparatus, sink equipment 320 as a reception apparatus, and an HDMI cable 130-5 (hereinafter simply referred to as a "cable 130-5") that is an AOC connecting the source equipment 310 and the sink equipment 320 to each other. In this FIG. 15, portions corresponding to those of FIG. 11 are denoted by identical reference signs, and detailed description of them is omitted suitably.

In the transmission system 10-5 depicted in FIG. 15, control information generated by the control unit 341 of the cable 130-5 is transmitted by a pulse signal of a specific pattern to the source equipment 310 through a data line (TMDS line).

In this case, the control unit 341 in the cable 130-5 controls the LDO output voltage by turning on/off an LDO regulator 332A in the plug on the source equipment 310 side to generate a pulse signal on the TMDS line. This pulse signal is transmitted to the source equipment 310 through the TMDS line. It is to be noted that, after the pulse signal is transmitted, the LDO regulator 332A is placed in an on state. Consequently, normal operation becomes possible.

Further, the pattern detection unit 316 of the source equipment 310 extracts the control information from the pulse signal transmitted thereto by the TMDS line and transmits the control information to the data rate control unit 312. In the source equipment 310, the data rate is controlled on the basis of the control information.

The other parts of the transmission system 10-5 depicted in FIG. 15 are configured similarly and operate similarly to those of the transmission system 10-2 described hereinabove with reference to FIG. 11. Also in the transmission system 10-5 depicted in FIG. 15, advantageous effects similar to those obtained by the transmission system 10-2 described hereinabove with reference to FIG. 11 can be achieved. It is to be noted that, although, in the transmission system 10-5 depicted in FIG. 15, the source equipment 310 leads out a line from both of the differential lines of the TMDS line to the pattern detection unit 316, this is intended to stabilize a characteristic by providing a parasitic capacitance to both of the differential lines. However, a line may also be led out from one of the differential lines of the TMDS line to the pattern detection unit 316.

Embodiment 6

Figure 16:
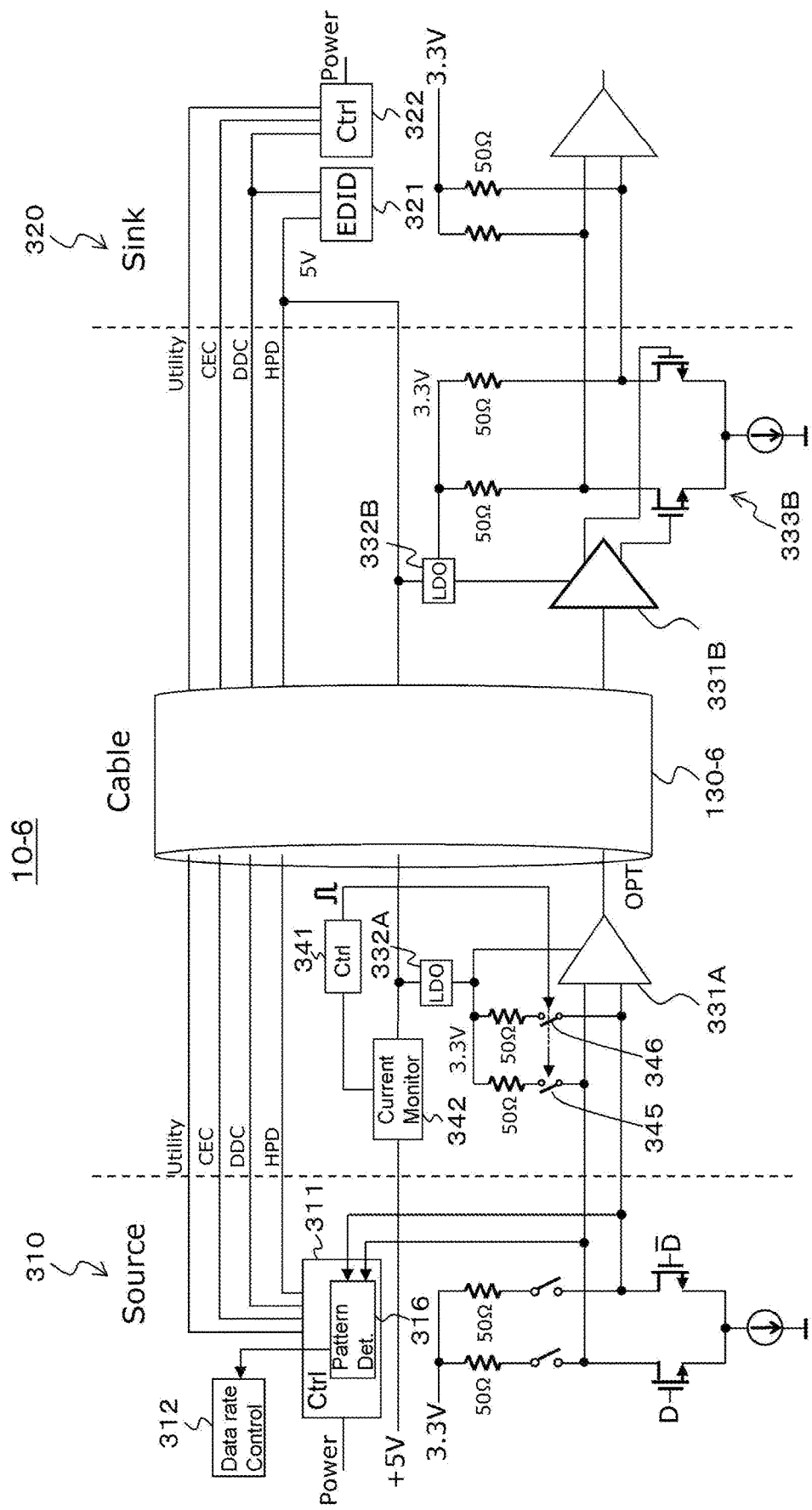
FIG. 16 is a view depicting an example of a configuration of a transmission system as an embodiment 6.

FIG. 16 depicts an example of a configuration of a transmission system 10-6 as an embodiment 6. The transmission system 10-6 is an HDMI transmission system in which the HDMI is used as a digital interface. The transmission system 10-6 includes source equipment 310 as a transmission apparatus, sink equipment 320 as a reception apparatus, and an HDMI cable 130-6 (hereinafter simply referred to as a "cable 130-6") that is an AOC connecting the source equipment 310 and the sink equipment 320 to each other. In this FIG. 16, portions corresponding to those of FIG. 15 are denoted by identical reference signs, and detailed description of them is suitably omitted.

Also in the transmission system 10-6 depicted in FIG. 16, control information generated by the control unit 341 of the cable 130-6 is transmitted by a pulse signal of a specific pattern to the source equipment 310 through a data line (TMDS line).

In this case, switches 345 and 346 are provided on a line connecting to a terminating resistor of the TMDS line. The control unit 341 in the cable 130-6 drives the switches 345 and 346 to open and close such that a pulse signal is generated on the TMDS line. This pulse signal is transmitted to the source equipment 310 through the TMDS line. It is to be noted that, after the pulse signal is transmitted, the switches 345 and 346 are placed in a closed state. Consequently, normal operation becomes possible.

The other parts of the transmission system 10-6 depicted in FIG. 16 are configured similarly and operate similarly to those of the transmission system 10-5 described hereinabove with reference to FIG. 15. Also in the transmission system 10-6 depicted in FIG. 16, advantageous effects similar to those obtained by the transmission system 10-5 described hereinabove with reference to FIG. 15 can be achieved.

Embodiment 7

Figure 17:
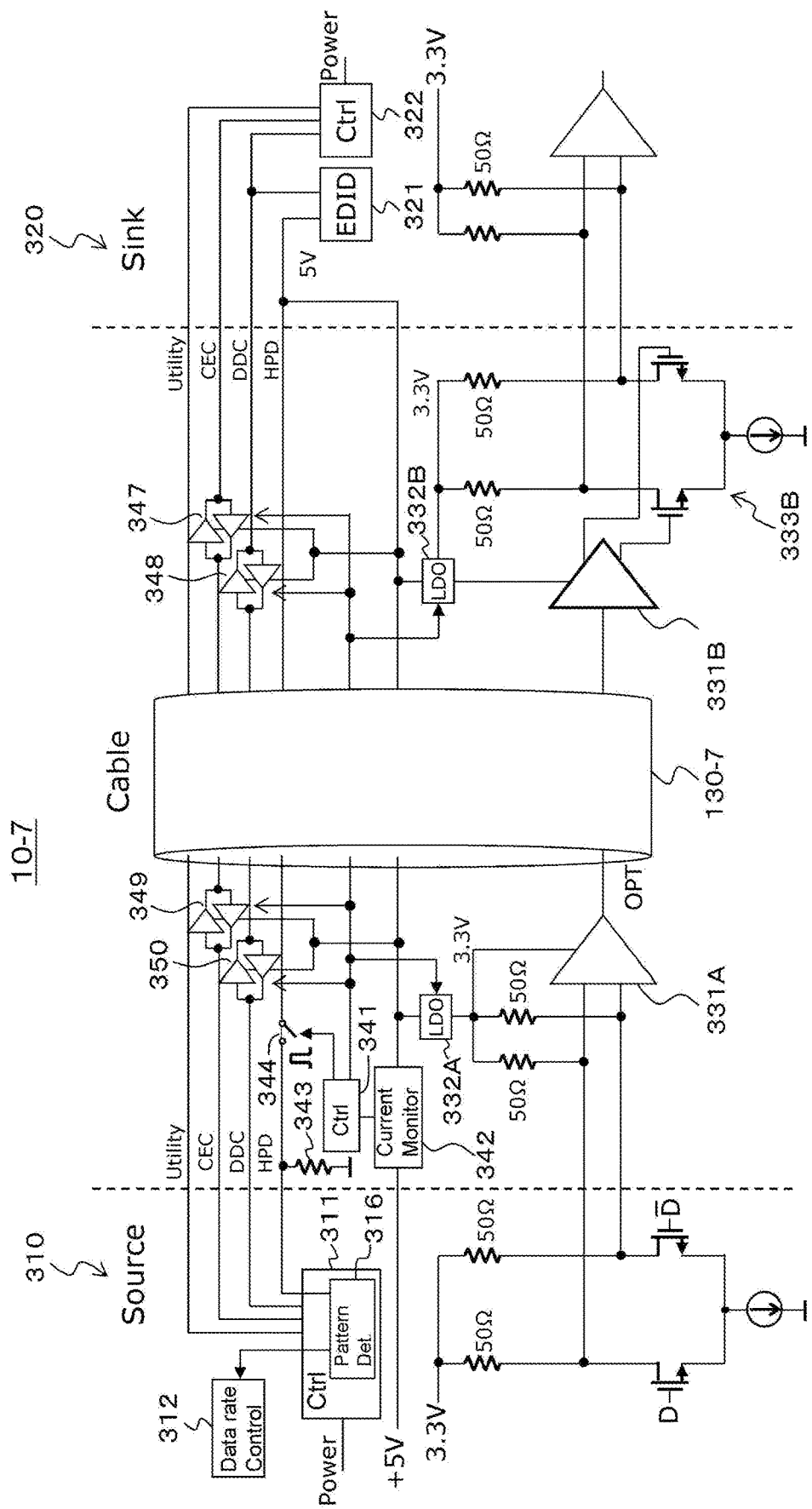
FIG. 17 is a view depicting an example of a configuration of a transmission system as an embodiment 7.

FIG. 17 depicts an example of a configuration of a transmission system 10-7 as an embodiment 7. The transmission system 10-7 is an HDMI transmission system in which the HDMI is used as a digital interface. The transmission system 10-7 includes source equipment 310 as a transmission apparatus, sink equipment 320 as a reception apparatus, and an HDMI cable 130-7 (hereinafter simply referred to as a "cable 130-7") that is an AOC connecting the source equipment 310 and the sink equipment 320 to each other. In this FIG. 17, portions corresponding to those of FIG. 11 are denoted by identical reference signs, and detailed description of them is suitably omitted.

In the embodiment described hereinabove with reference to FIG. 11, current that is consumed by a circuit for driving a high speed signal line is named as current that is consumed in the cable. However, as depicted in the transmission system 10-7 illustrated in FIG. 17, current for driving a control signal line may also be the current that is consumed in the cable.

In the transmission system 10-7 depicted in FIG. 17, bidirectional buffers 347 and 348 are inserted in the CEC line and the DDC line in the sink side plug of the cable 130-7, respectively. Further, in the transmission system 10-7, bidirectional buffers 349 and 350 are inserted in the CEC line and the DDC line in the source side plug of the cable 130-7, respectively.

The other parts of the transmission system 10-7 depicted in FIG. 17 are configured similarly and operate similarly to those of the transmission system 10-2 described hereinabove with reference to FIG. 11. Also in the transmission system 10-7 depicted in FIG. 17, advantageous effects similar to those obtained by the transmission system 10-2 described hereinabove with reference to FIG. 11 can be achieved. It is to be noted that transmission of a pulse signal from the cable 130-7 to the source equipment 310 may be performed by the methods depicted in FIGS. 13 to 16.

Embodiment 8

Figure 18:
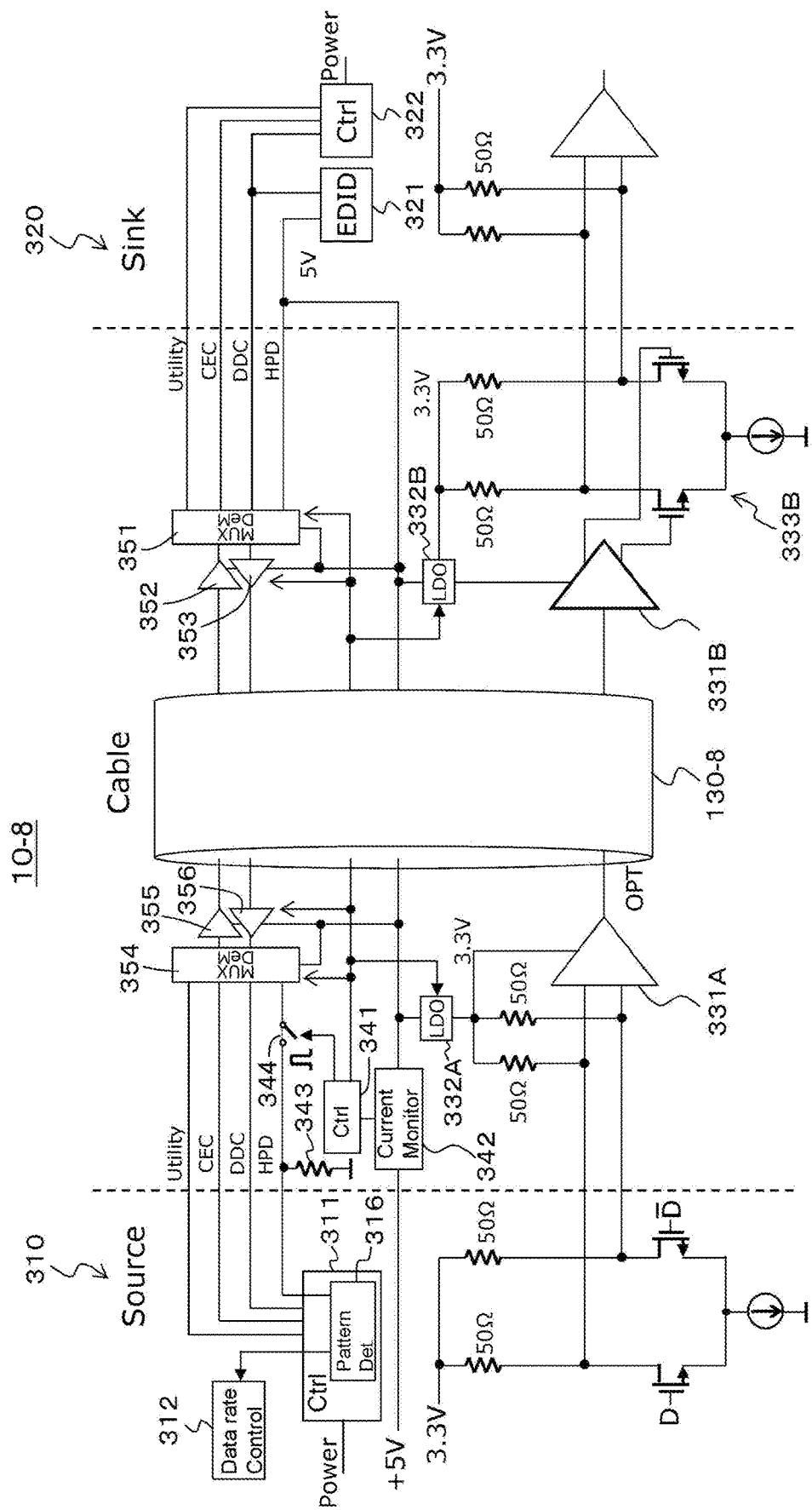
FIG. 18 is a view depicting an example of a configuration of a transmission system as an embodiment 8.

FIG. 18 depicts an example of a configuration of a transmission system 10-8 as an embodiment 8. The transmission system 10-8 is an HDMI transmission system in which the HDMI is used as a digital interface. The transmission system 10-8 includes source equipment 310 as a transmission apparatus, sink equipment 320 as a reception apparatus, and an HDMI cable 130-8 (hereinafter simply referred to as a "cable 130-8") that is an AOC connecting the source equipment 310 and the sink equipment 320 to each other. In this FIG. 18, portions corresponding to those of FIG. 11 are denoted by identical reference signs, and detailed description of them is suitably omitted.

In the embodiment described hereinabove with reference to FIG. 11, current that is consumed by a circuit for driving a high speed signal line is named as current that is consumed in the cable. However, as depicted in the transmission system 10-8 illustrated in FIG. 18, further, current for driving a control signal line may also be the current that is consumed in the cable.

While the transmission system 10-7 depicted in FIG. 17 is an example in which control signals are transmitted by individual lines, the transmission system 10-8 depicted in FIG. 18 is an example in which control signals are optically transmitted by a single transmission line using a multiplexer/demultiplexer (MUX/DeM).

In the transmission system 10-8 depicted in FIG. 18, a multiplexer/demultiplexer 351, a conversion circuit 352 that converts light into electricity, and a conversion circuit 353 that converts electricity into light are arranged in the sink side plug of the cable 130-8. Further, a multiplexer/demultiplexer 354, a conversion circuit 355 that converts electricity into light, and a conversion circuit 356 that converts light into electricity are arranged in the source side plug of the cable 130-8.

The other parts of the transmission system 10-8 depicted in FIG. 18 are configured similarly and operate similarly to those of the transmission system 10-2 described hereinabove with reference to FIG. 11. Also in the transmission system 10-8 depicted in FIG. 18, advantageous effects similar to those obtained by the transmission system 10-2 described hereinabove with reference to FIG. 11 can be achieved. It is to be noted that transmission of a pulse signal from the cable 130-8 to the source equipment 310 may be performed by the methods depicted in FIGS. 13 to 16.

2. Modification

It is to be noted that, in the embodiments described above, the cable observes a current amount the source equipment 310 can supply to the +5 V power supply line (available current amount) to generate and transmit data rate control information according to the current amount to the source equipment 310, and the source equipment 310 controls the data rate on the basis of the data rate control information to maintain the communication quality.

However, a waveform characteristic of data to be outputted from the source equipment 310 may be controlled according to a current amount the source equipment 310 can supply to the +5 V power supply line (available current amount) to maintain the communication quality. In such case, the control unit 341 of the cable generates control information (emphasis setting information) for controlling a waveform characteristic and transmits this control information to the source equipment 310. Then, the source equipment 310 controls the waveform characteristic of the data on the basis of this control information. FIG. 19A depicts an example of a table used in the control unit 341.

Further, in the case where a cable characteristic according to the current amount is known, it is also possible for the control unit 341 of the cable to transmit the information to the source equipment 310 and prompt the source equipment 310 to take measures according to the cable characteristic. FIG. 19B depicts an example of a table used in the control unit 341 in such case.

Further, in the embodiments described above, the cable transmits control information for controlling the data rate to the source equipment 310. However, the cable may also transmit, in the case where the cable has register save information such as a cable ID and a cable characteristic feature, such register save information to the source equipment 310 together with the control information.

Further, in the embodiments described above, description was given by taking a transmission system that connects source equipment and sink equipment to each other by an HDMI cable, as an example. However, since the present technology is similarly applicable to a cable that uses a mechanism defined in "VESA Plug and Display (P&D) Specification" as well, the present technology can also be applied to DVI, MHL, Display Port, and so forth. Further, it is possible to apply the present technology not only to the AOC or the ACC but also to wireless communication and so forth. Furthermore, it is a matter of course that the present technology can similarly be applied to a USB cable and so forth as well.

Further, the present technology can also take such configurations as described below.

(1)

A cable for being connected between first electronic equipment and second electronic equipment, including:

a current consumption unit configured to receive supply of current from the first electronic equipment through a power supply line;

a current monitor unit configured to observe a current amount the first electronic equipment is capable of supplying to the power supply line; and an information transmission unit configured to transmit control information according to the observed current amount to the first electronic equipment.

(2)
The cable according to (1) above, in which
the current monitor unit
observes a current amount flowing through the power supply line when the current consumption unit is placed in a current consumption state, as a current amount the first electronic equipment is capable of supplying to the power supply line.

(3)
The cable according to (1) above, in which
the current monitor unit
includes a variable current consumption circuit that receives supply of current from the first electronic equipment through the power supply line, and
observes maximum current that flows through the power supply line when a current consumption amount in the variable current consumption circuit is sequentially changed from a small amount to a great amount, as the current amount the first electronic equipment is capable of supplying to the power supply line.

(4)
The cable according to any one of (1) to (3) above, in which
the information transmission unit generates the control information in accordance with a table or by calculation on the basis of the observed current amount.

(5)
The cable according to any one of (1) to (4) above, in which
the information transmission unit transmits the control information by a pulse signal of a specific pattern.

(6)
The cable according to any one of (1) to (5), in which
the current consumption unit includes a circuit for adjusting signal quality interposed in a data line, and the control information includes information for controlling a state of data to be supplied from the first electronic equipment to the data line so as to allow the circuit to operate.

(7)
The cable according to (6) above, in which
the control information includes information for controlling a data rate or a waveform characteristic.

(8)
A control information transmission method for a cable that includes
a current consumption unit that is connected between first electronic equipment and second electronic equipment and receives supply of current from the first electronic equipment through a power supply line,
the control information transmission method including:
observing a current amount the first electronic equipment is capable of supplying to the power supply line to transmit control information according to the observed current amount to the first electronic equipment.

(9)
A connection apparatus for being connected between first electronic equipment and second electronic equipment, including:
a current consumption unit configured to receive supply of current from the first electronic equipment through a power supply line;
a current monitor unit configured to observe a current amount the first electronic equipment is capable of supplying to the power supply line; and
an information transmission unit configured to transmit control information according to the observed current amount to the first electronic equipment.

(10)
Electronic equipment for being connected to external equipment through a cable, including:
an information reception unit configured to receive control information from the cable; and
a control unit configured to control a state of a signal to be supplied to the cable, on the basis of the control information.

(11)
The electronic equipment according to (10) above, in which
the information reception unit receives the control information by a pulse signal of a specific pattern.

(12)
The electronic equipment according to (10) or (11), in which
the control information includes information for controlling a data rate or a waveform characteristic, and
the control unit controls a data rate or a waveform characteristic of data to be supplied to a data line of the cable.

(13)
An output data controlling method for electronic equipment connected to external equipment through a cable, including:
controlling a state of signal to be supplied to the cable, on the basis of control information received through the cable.

REFERENCE SIGNS LIST 10-1 to 10-8 . . . Transmission system
130-1 to 130-8 . . . HDMI cable
310 . . . Source equipment
311 . . . Control unit
312 . . . Data rate control unit
313 . . . Data generation unit
314 . . . Buffer
315 . . . Driver
316 . . . Pattern detection unit
320 . . . Sink equipment
321 . . . EDID ROM
322 . . . Control unit
331A, 331B . . . Conversion circuit
332A, 332B . . . LDO regulator
333B . . . Current driving unit
341 . . . Control unit
342 . . . Current monitor unit
342a . . . Ammeter
342b . . . Variable resistor
342c . . . Current source
343 . . . Pull-down resistor
344, 345, 346 . . . Switch
347 to 350 . . . Bidirectional buffer
351, 354 . . . Multiplexer/demultiplexer
352, 353, 354, 355 . . . Conversion circuit

The invention claimed is:
1. A cable for being connected between first electronic equipment and second electronic equipment, comprising:
a current consumption unit configured to receive supply of current from the first electronic equipment through a power supply line;
a current monitor unit includes a variable current consumption circuit that receives supply of current from the first electronic equipment through the power supply line and the current monitor unit is configured to
observe a current amount the first electronic equipment is capable of supplying to the power supply line; and
observe maximum current that flows through the power supply line when a current consumption amount in the variable current consumption circuit is sequentially changed from a small amount to a great amount, as the current amount the first electronic equipment is capable of supplying to the power supply line; and
an information transmission unit configured to transmit control information according to the observed current amount to the first electronic equipment.

2. The cable according to claim 1, wherein the current monitor unit is further configured to observe a current amount flowing through the power supply line when the current consumption unit is placed in a current consumption state, as a current amount the first electronic equipment is capable of supplying to the power supply line.

3. The cable according to claim 1, wherein the information transmission unit is further configured to generate the control information in accordance with a table or by calculation based on the observed current amount.

4. The cable according to claim 1, wherein the information transmission unit is further configured to transmit the control information by a pulse signal of a specific pattern.

5. The cable according to claim 1, wherein
the current consumption unit includes a circuit configured to adjust signal quality interposed in a data line, and
the control information includes control information for controlling a state of data to be supplied from the first electronic equipment to the data line so as to allow the circuit to operate.

6. The cable according to claim 5, wherein
the control information includes information for controlling a data rate or a waveform characteristic.

7. A control information transmission method for a cable that includes
a current consumption unit that is connected between first electronic equipment and second electronic equipment and receives supply of current from the first electronic equipment through a power supply line,
a current monitor unit includes a variable current consumption circuit that receives supply of current from the first electronic equipment through the power supply line, and
the control information transmission method comprising:
observing a current amount the first electronic equipment is capable of supplying to the power supply line to transmit control information according to the observed current amount to the first electronic equipment, and
observing maximum current that flows through the power supply line based on a current consumption amount in the variable current consumption circuit, wherein the current consumption amount is sequentially changed from a small amount to a great amount, as the current amount the first electronic equipment is capable of supplying to the power supply line.

8. A connection apparatus connected between first electronic equipment and second electronic equipment, comprising:
a current consumption unit configured to receive supply of current from the first electronic equipment through a power supply line;
a current monitor unit includes a variable current consumption circuit that receives supply of current from the first electronic equipment through the power supply line and the current monitor unit is configured to
observe a current amount the first electronic equipment is capable of supplying to the power supply line; and
observe maximum current that flows through the power supply line when a current consumption amount in the variable current consumption circuit is sequentially changed from a small amount to a great amount, as the current amount the first electronic equipment is capable of supplying to the power supply line; and
an information transmission unit configured to transmit control information according to the observed current amount to the first electronic equipment.

\* \* \* \* \*